US012802299B2

(12) United States Patent
Aggarwal et al.

(10) Patent No.: US 12,802,299 B2
(45) Date of Patent: Nov. 17, 2026

(54) TEXT-TO-PATTERN GENERATION

(71) Applicant: ADOBE INC., San Jose, CA (US)

(72) Inventors: Pranav Vineet Aggarwal, Santa Clara, CA (US); Abhishek Rai, Noida (IN); Ajinkya Gorakhnath Kale, San Jose, CA (US); Vineet Batra, Delhi (IN); Ritiz Tambi, San Francisco, CA (US); Purvak Lapsiya, Toronto (CA); Sachin Madhav Kelkar, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 126 days.

(21) Appl. No.: 18/823,837

(22) Filed: Sep. 4, 2024

(65) Prior Publication Data

US 2026/0065532 A1 Mar. 5, 2026

(51) Int. Cl.
*G06T 11/10* (2026.01)
*G06F 40/40* (2020.01)
*G06N 3/092* (2023.01)

(52) U.S. Cl.
CPC .............. *G06T 11/10* (2026.01); *G06F 40/40* (2020.01); *G06N 3/092* (2023.01)

(58) Field of Classification Search
None
See application file for complete search history.

(56) References Cited

U.S. PATENT DOCUMENTS 11,922,550 B1 3/2024 Ramesh et al.
12,493,937 B2 12/2025 Harikumar et al.
12,499,519 B1 * 12/2025 Karpman .................. G06T 5/70
12,530,822 B2 1/2026 Ravi et al.
12,536,722 B2 1/2026 Aggarwal et al.
12,536,778 B2 1/2026 Bai et al.
12,579,705 B2 3/2026 Li et al.

(Continued)

FOREIGN PATENT DOCUMENTS

CN 117768678 A 3/2024
WO WO2024107884 A1 5/2024

(Continued)

OTHER PUBLICATIONS

Black, et al., "Training Diffusion Models with Reinforcement Learning", arXiv preprint arXiv:2305.13301v2 [cs.LG] May 23, 2023, 21 pages.

(Continued)

*Primary Examiner* — Ryan M Gray
(74) *Attorney, Agent, or Firm* — F. CHAU & ASSOCIATES, LLC

(57) ABSTRACT

A method, apparatus, non-transitory computer readable medium, and system for image generation include obtaining an input prompt comprising a pattern element and a target level of an image attribute. A guidance feature representing the pattern element is generated, using a prior model, based on the input prompt and the target level of the image attribute. The prior model is trained using reinforcement learning to generate guidance features for pattern image generation based on the target level of the image attribute. An image generation model generates a synthesized image based on the guidance feature. The synthesized image includes a set of versions of the pattern element with the target level of the image attribute.

20 Claims, 19 Drawing Sheets

(56) References Cited

U.S. PATENT DOCUMENTS

| | | | | |
|---|---|---|---|---|
| 12,602,847 | B2 | 4/2026 | Couleaud et al. | |
| 2023/0053317 | A1* | 2/2023 | Luo | G06T 11/10 |
| 2024/0161403 | A1 | 5/2024 | Lin et al. | |
| 2024/0185035 | A1 | 6/2024 | Yu et al. | |
| 2024/0221242 | A1* | 7/2024 | Greenen | G06T 11/10 |
| 2024/0404144 | A1 | 12/2024 | Aggarwal et al. | |
| 2025/0095226 | A1 | 3/2025 | Ungureanu-Contes et al. | |
| 2025/0095227 | A1 | 3/2025 | Ungureanu-Contes et al. | |
| 2025/0111866 | A1 | 4/2025 | Ceylan Aksit et al. | |
| 2025/0278816 | A1 | 9/2025 | Aggarwal et al. | |
| 2025/0308091 | A1* | 10/2025 | Zhu | G06T 11/10 |
| 2025/0322561 | A1 | 10/2025 | Ungureanu-Contes et al. | |
| 2026/0004193 | A1 | 1/2026 | Lee et al. | |
| 2026/0067113 | A1* | 3/2026 | Brenna | G06F 16/33295 |

FOREIGN PATENT DOCUMENTS

| | | | |
|---|---|---|---|
| WO | WO2024130137 | A1 | 6/2024 |
| WO | WO2024163083 | A1 | 8/2024 |
| WO | WO2024206995 | A1 | 10/2024 |
| WO | WO2024249060 | A1 | 12/2024 |

OTHER PUBLICATIONS

Fan, et al., "DPOK: Reinforcement Learning for Fine-tuning Text-to-Image Diffusion Models", arXiv preprint arXiv:2305.16381v1 [cs.LG] May 25, 2023, 26 pages.

Schmidhuber, "Reinforcement Learning Upside Down: Don't Predict Rewards—Just Map Them to Actions", arXiv preprint arXiv:1912.02875v2 [cs.AI] Jun. 23, 2020, 22 pages.

Cao, et al., "Reinforcement Learning for Generative AI: A Survey", arXiv preprint arXiv:2308.14328v2[cs.LG] Aug. 29, 2023, 35 pages.

Aggarwal, et al., "Controlled and Conditional Text to Image Generation with Diffusion Prior", arXiv preprint arXiv:2302.11710v1 [cs.CV] Feb. 23, 2023, 24 pages.

Ramesh, et al., "Hierarchical Text-Conditional Image Generation with CLIP Latents", arXiv preprint arXiv:2204.06125v1 [cs.CV] Apr. 13, 2022, 1(2), 3, 27 pages.

Zhang, et al., "Aligning Vision Models with Human Aesthetics in Retrieval: Benchmarks and Algorithms", arXiv preprint arXiv:2406.09397v1 [cs.CV] Jun. 13, 2024, pp. 1-28.

Srivastava, et al., "Training Agents Using Upside-Down Reinforcement Learning", arXiv preprint arXiv:1912.02877v2 [cs.LG] Sep. 3, 2021, pp. 1-31.

Gao, et al., "Can Pre-Trained Text-to-Image Models Generate Visual Goals for Reinforcement Learning?", 37th Conference o Neural Information Processing Systems, pp. 1-14 (2023).

Office Action dated Mar. 3, 2026 in related U.S. Appl. No. 18/823,839.

Office Action dated Oct. 21, 2025 in related U.S. Appl. No. 18/443,590.

Junnan Li, Dongxu Li, Caiming Xiong, and Steven Hoi, 2022, "BLIP: Bootstrapping Language-Image Pre-training for Unifed Vision-Language Understanding and Generation", arXiv:2201.12086 [cs.CV] (Year: 2022), 12 pages.

Liu, Vivian, Han Qiao, and Lydia Chilton, "Opal: Multi modal image generation for news illustration," Proceedings of the 35th Annual ACM Symposium on User Interface Software and Technology, 2022, (Year: 2022), 17 pages.

Office Action dated Jul. 8, 2026 in corresponding U.S. Appl. No. 18/823,839.

* cited by examiner

Object Specific Patterns:

Artistic Wallpapers:

Geometric Patterns:

800

Topical Patterns:

805

TEXT-TO-PATTERN GENERATION

BACKGROUND

The following relates generally to image processing, and more specifically to pattern generation using machine learning. Digital image processing refers to the use of a computer to edit a digital image using an algorithm or a processing network. In some cases, image processing software can be used for various tasks, such as image editing, image restoration, image generation, etc. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, involves the use of diffusion models to synthesize images. Diffusion models can be used for various image generation tasks including image super-resolution, generation of images with perceptual metrics, conditional generation (e.g., generation based on text guidance), image inpainting, and image manipulation. Specifically, diffusion models are trained to take random noise as input and generate unseen images with features similar to the training data. However, conventional image generation models do not accurately generate some kinds of images, including some pattern images.

SUMMARY

The present disclosure describes systems and methods for pattern generation. Embodiments of the present disclosure include an image generation apparatus that receives an input prompt and generates a synthesized image including a set of versions of a pattern element. The image generation apparatus includes a diffusion prior model that is trained to generate guidance features for pattern image generation based on input prompts comprising a target level of an image attribute. The prior model is trained using upside down reinforcement learning (UDRL) by providing a "reward" (e.g., a phrase indicating a target level of an image attribute) as part of input conditioning during training. In some cases, the target level of the image attribute is provided based on an output of a classifier model for a training image. In some cases, an input prompt includes a pattern classifier score, an aesthetic score, or both. The pattern classifier score and the aesthetic score are prepended to input prompts (i.e., the two scores are added as part of the input prompts) when training the prior model. Additionally, the input prompt may include a pattern attribute phrase (e.g., pattern flat colors).

A method, apparatus, and non-transitory computer readable medium for image generation are described. One or more embodiments of the method, apparatus, and non-transitory computer readable medium include obtaining an input prompt comprising a pattern element and a target level of an image attribute; generating, using a prior model, a guidance feature representing the pattern element based on the input prompt and the target level of the image attribute, wherein the prior model is trained using reinforcement learning (i.e., UDRL) to generate guidance features for pattern image generation based on the target level of the image attribute; and generating, using an image generation model, a synthesized image based on the guidance feature, wherein the synthesized image includes a plurality of versions of the pattern element with the target level of the image attribute.

A method, apparatus, and non-transitory computer readable medium for image generation are described. One or more embodiments of the method, apparatus, and non-transitory computer readable medium include obtaining a training set including an input prompt comprising a pattern element and a target level of an image attribute and training, using upside down reinforcement learning (UDRL) on the training set, a prior model to generate guidance features for pattern image generation based on the target level of the image attribute.

An apparatus and method for image generation are described. One or more embodiments of the apparatus and method include at least one processor; at least one memory including instructions executable by the at least one processor; a prior model comprising parameters in the at least one memory and trained to generate a guidance feature representing a pattern element based on an input prompt comprising the pattern element and a target level of an image attribute, wherein the prior model is trained using reinforcement learning to generate guidance features for pattern image generation based on the target level of the image attribute; and an image generation model comprising parameters in the at least one memory and trained to generate a synthesized image based on the guidance feature, wherein the synthesized image includes a plurality of versions of the pattern element.

DETAILED DESCRIPTION

Figure 1:
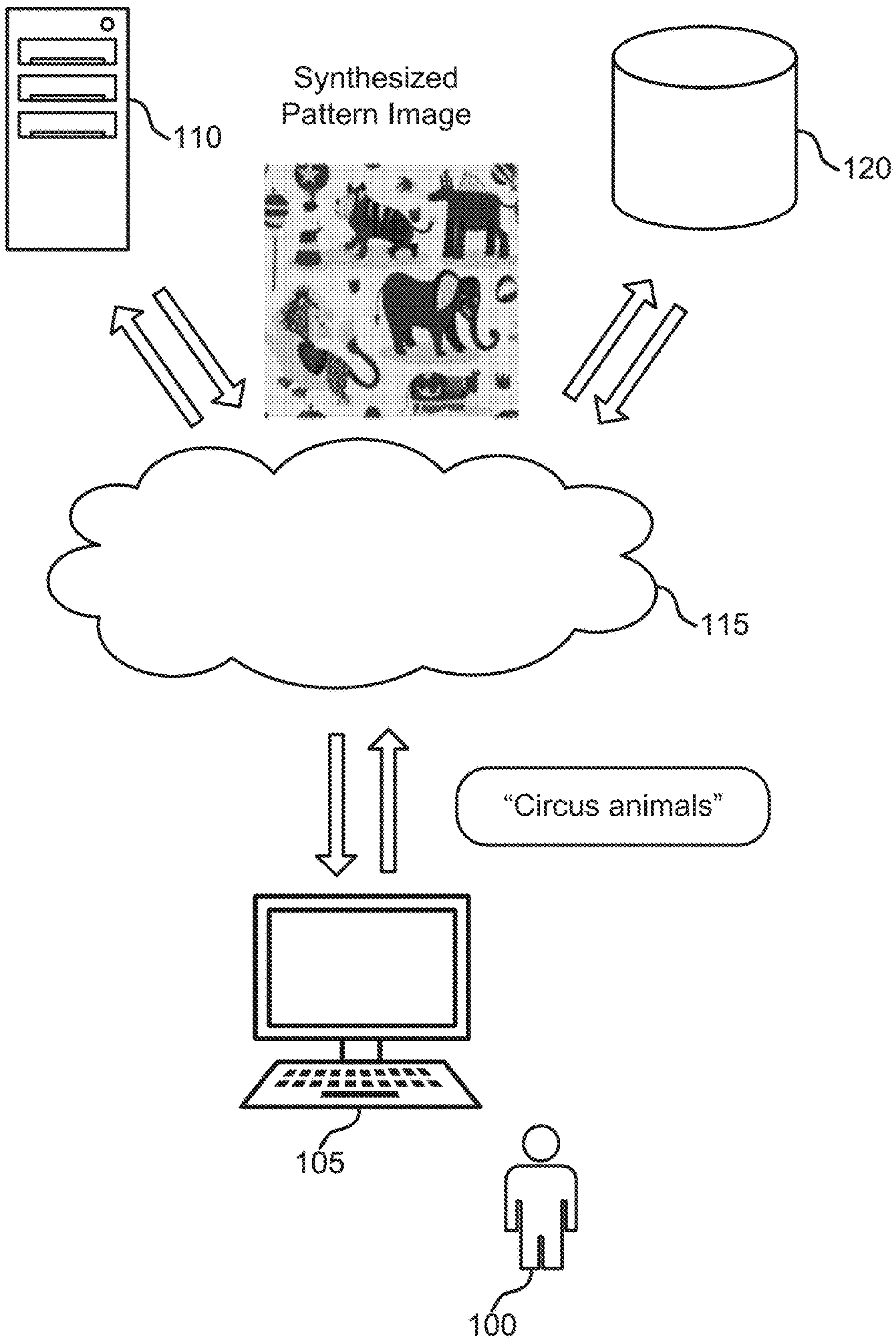
FIG. 1 shows an example of an image generation system according to aspects of the present disclosure.

The present disclosure describes systems and methods for pattern generation. Embodiments of the present disclosure include an image generation apparatus that receives an input prompt and generates a synthesized image including a set of versions of a pattern element. The image generation apparatus includes a diffusion prior model that is trained to generate guidance features for pattern image generation based on input prompts comprising a target level of an image attribute. The prior model is trained using upside down reinforcement learning (UDRL) by providing a "reward" (e.g., a phrase indicating a target level of an image attribute) as part of input conditioning during training.

In some cases, the target level of the image attribute is provided based on an output of a classifier model for a training image. In some cases, an input prompt includes a pattern classifier score, an aesthetic score, or both. The pattern classifier score and the aesthetic score are prepended to input prompts (i.e., the two scores are added as part of the input prompts) when training the prior model. Additionally, the input prompt may include a pattern attribute phrase (e.g., pattern flat colors).

Diffusion models are a class of generative neural networks that can be trained to generate new data with features similar to features found in training data. Diffusion models can be used in image synthesis, image completion tasks, etc. However, diffusion models may generate poor results because diffusion models are not specifically trained for vector graphic pattern generation. Conventional models cannot guarantee the aesthetic quality or whether generated images include vector graphic patterns.

Embodiments of the present disclosure include an image generation apparatus configured to take an input prompt comprising a pattern element and a target level of an image attribute. The image generation apparatus generates, using an image generation model, a synthesized image based on the input prompt, where the synthesized image includes a set of versions of the pattern element. During training, an example of input prompt is "classifier 0.9; aesthetic 5.5; A wallpaper with circus animals". Here, a pattern element refers to "circus animal". An aesthetic classifier is used to find aesthetic scores for each of the samples. The aesthetic score ranges from 1 to 10. A pattern classifier is used to classify between vector graphic patterns and non-patterns to generate scores for each of the samples. The pattern classifier ranges from 0 to 1 based on tilability, repeatability, vector quality, etc.

For example, a preliminary prompt is "Circus animals", which is provided by a user. At inference time, the aesthetic score and pattern classifier score are added to the preliminary prompt to obtain an input prompt "classifier 0.9; aesthetic 6.5; Circus animals". The input prompt is then fed to a diffusion prior model and an image generation model (e.g., U-Net) to generate synthesized pattern images.

According to one or more embodiments, a training dataset having a combination of different types of training samples is used to train the prior model. The training dataset includes background images and textures. For example, training samples are collected by gathering samples with "background" or "texture" in them or using clustering methods. Additionally, the training dataset includes pattern and background samples. Additionally, the training dataset includes synthetic pattern dataset to add more concepts as repeated patterns (e.g., geometric synthetic dataset for more geometric patterns). Furthermore, the training dataset includes short pattern query dataset. The short pattern query dataset includes samples with short queries and images which are vector graphic patterns.

In some cases, a user provides a preliminary prompt comprising a pattern element (e.g., a circus animal). A pattern attribute (e.g., "pattern", "flat colors", "pattern flat colors") is added to the preliminary prompt to obtain the input prompt. The input prompt is fed to the diffusion prior model and the image generation model (e.g., a text-to-image diffusion model) to generate synthesized pattern images. Adding the word "pattern" helps reconfirm that the generated images are repeated patterns as the overall structure while adding the phrase "flat colors" increases the quality of the patterns by making them relatively clean and flat.

The present disclosure describes systems and methods that improve on conventional image generation models by providing more accurate and aesthetic patterns in synthesized images. For example, users can achieve visually appealing patterns having improved aesthetics, and obtain synthesized patterns that are repeated seamlessly. Some embodiments achieve improved text-to-pattern generation capacity by training a diffusion prior model using upside down reinforcement learning on a training set that includes customized input prompts. The customized input prompts include aesthetic scores or pattern classifier scores that are added to training text prompts. At inference time, a pattern classifier score, an aesthetic score, or both scores, are added to a user-provided prompt to obtain an input prompt that guides the text-to-pattern generation process.

Examples of application in text-to-pattern generation context are provided with reference to FIGS. 2-8. Details regarding the architecture of an example image generation system are provided with reference to FIGS. 1 and 10-13. Details regarding the image generation process are provided with reference to FIG. 9. Details regarding training a diffusion prior model are provided with reference to FIGS. 16-17.

Text-to-Pattern Generation

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 10.

In an example shown in FIG. 1, a preliminary prompt is provided by user 100 and transmitted to image generation apparatus 110, e.g., via user device 105 and cloud 115. The preliminary prompt includes a pattern element. For example, the preliminary prompt is "Circus animals". A target level of an image attribute is added to the preliminary prompt to obtain an input prompt. The target level of the image attribute comprises a scalar value. In some cases, the image attribute includes a pattern classifier attribute, aesthetic attribute, or both. In this example, the input prompt is "classifier 0.9; aesthetic 6.5; Circus animals". "classifier 0.9" and "aesthetic 6.5" refer to an aesthetic score and a pattern classifier score, respectively. Additionally or alternatively, a pattern attribute is added to the preliminary prompt. In some examples, the pattern attribute includes the phrase "pattern flat colors", which is added to the preliminary prompt. The input prompt then becomes "classifier 0.9; aesthetic 6.5; Circus animals, pattern flat colors".

Image generation apparatus 110, using a prior model, generates a guidance feature representing the pattern element based on the input prompt. The prior model is trained using reinforcement learning to generate guidance features for pattern image generation based on the target level of the image attribute. Image generation apparatus 110 generates, using an image generation model, a synthesized image based on the guidance feature. The synthesized image includes a set of versions of the pattern element. Image generation apparatus 110 returns the synthesized image to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image generator, an image editing tool). In some examples, the image processing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image generation apparatus 110 includes a computer-implemented network comprising a text encoder and an image generator. Image generation apparatus 110 may also include a processor unit, a memory unit, an I/O module, a user interface, and a training component. The training component is used to train a machine learning model comprising a prior model and a text-to-image generation model. Additionally, image generation apparatus 110 can communicate with database 120 via cloud 115. In some cases, the architecture of the text-to-pattern generation network is also referred to as a network, a machine learning model, or a network model. Further detail regarding the architecture of image generation apparatus 110 is provided with reference to FIGS. 10-15. Further detail regarding the operation of image generation apparatus 110 is provided with reference to FIGS. 2 and 9.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., training dataset including text-image pairs) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
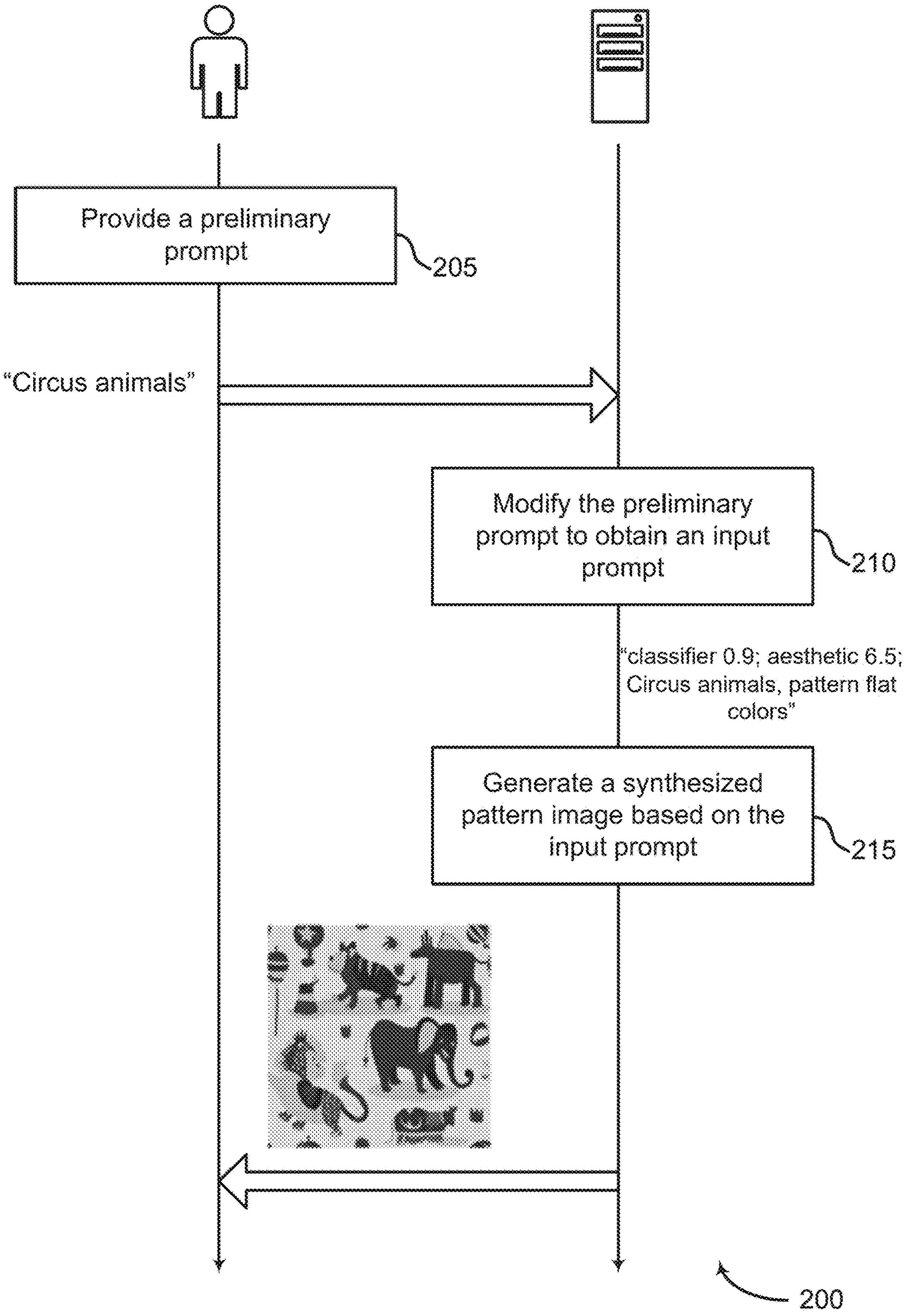
FIG. 2 shows an example of text-to-pattern image generation according to aspects of the present disclosure.

FIG. 2 shows an example of a method 200 for text-to-pattern image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a preliminary prompt. In some cases, the operations of this step refer to, or may be performed by, a user as described with reference to FIG. 1. In some examples, the user provides a preliminary prompt, "Circus animals", which comprises a pattern element. In another example, a preliminary prompt is "collection of striped geometric patterns".

At operation 210, the system modifies the preliminary prompt to obtain an input prompt. In some cases, the operations of this step refer to, or may be performed by, an image generation apparatus as described with reference to FIGS. 1 and 10. In some cases, a target level of an image attribute is added to the preliminary input to obtain an input prompt. The target level of the image attribute may include an aesthetic score, a pattern classifier score, or both. In the example above, the input prompt is "classifier 0.9; aesthetic 6.5; Circus animals". Additionally or alternatively, a pattern attribute is added to the preliminary prompt, e.g., "pattern flat colors" is added to the end of the preliminary prompt to obtain the input prompt. For example, the input prompt is "classifier 0.9; aesthetic 6.5; Circus animals, pattern flat colors".

At operation 215, the system generates a synthesized pattern image based on the modified input prompt. In some cases, the operations of this step refer to, or may be performed by, an image generation apparatus as described with reference to FIGS. 1 and 10.

Figure 3:
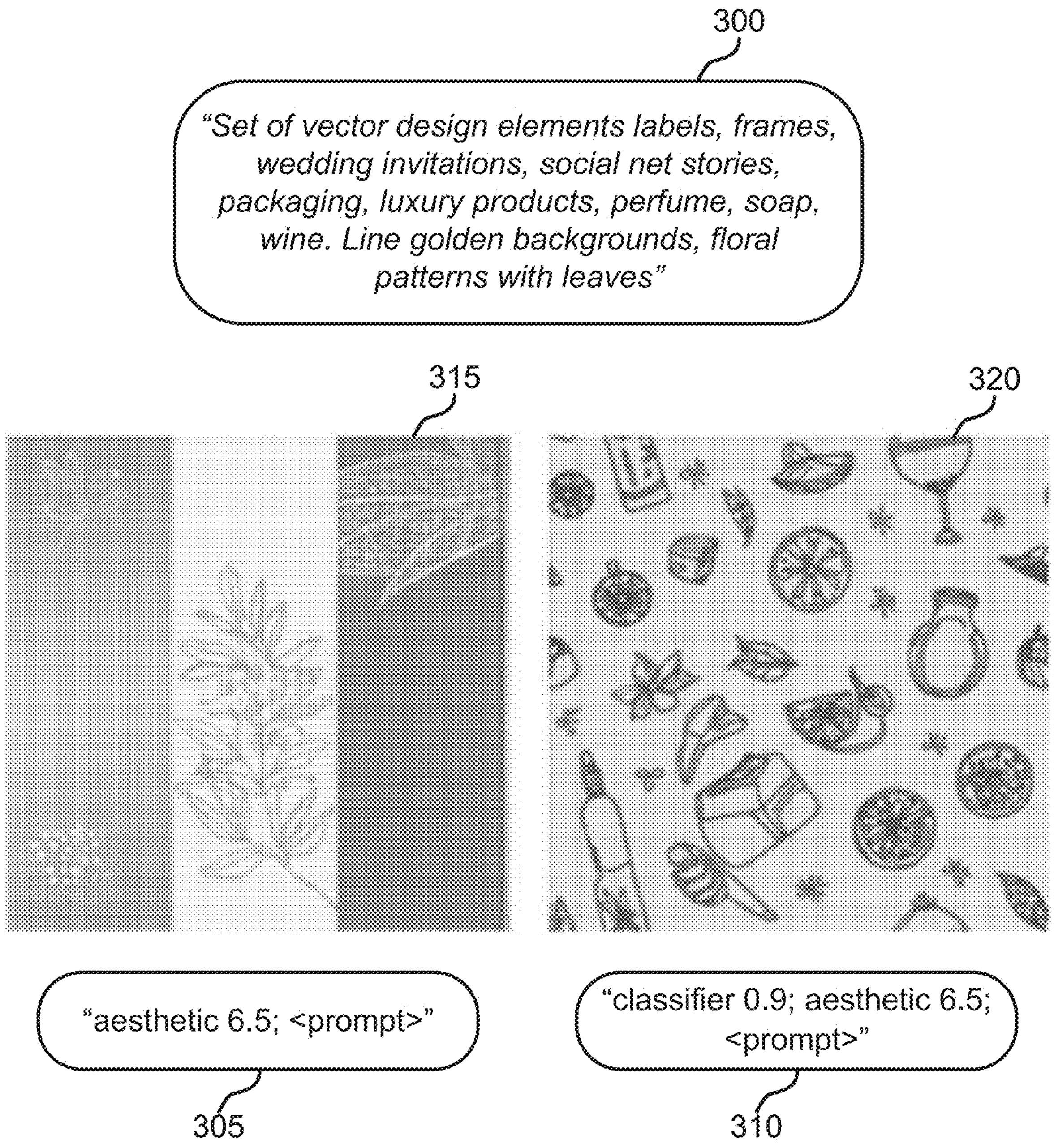
FIGS. 3 through 6 show examples of synthesized pattern images according to aspects of the present disclosure.

FIG. 3 shows an example of synthesized pattern images according to aspects of the present disclosure. The example shown includes preliminary prompt 300, first input prompt 305, second input prompt 310, first synthesized image 315, and second synthesized image 320.

In some examples, preliminary prompt 300 is "Set of vector design elements labels, frames, wedding invitations, social net stories, packaging, luxury products, perfume, soap, wine. Line golden backgrounds, floral patterns with leaves". A target level of an image attribute is added to the preliminary prompt 300 to obtain first input prompt 305. First input prompt 305 is "aesthetic 6.5; <prompt>". Here, <prompt> refers to preliminary prompt 300. A machine learning model is trained with aesthetic score(s) and without pattern classifier score(s). At inference time, the machine learning model generates first synthesized image 315 based on first input prompt 305.

In some examples, a target level of an image attribute is added to the preliminary prompt 300 to obtain second input prompt 310. Second input prompt 310 is "classifier 0.9; aesthetic 6.5; <prompt>". Here, <prompt> refers to preliminary prompt 300. A machine learning model is trained with aesthetic score(s) and pattern classifier score(s). At inference time, the machine learning model generates second synthesized image 320 based on second input prompt 310. Second synthesized image 320 shows increased tileability, repeatability, vector image quality compared to first synthesized image 315. The repetition of patterns in second synthesized image 320 is seamless.

Preliminary prompt 300 is an example of, or includes aspects of, the corresponding element described with reference to FIGS. 4, 14, and 15. First input prompt 305 is an example of, or includes aspects of, the corresponding element described with reference to FIGS. 4-6. Second input prompt 310 is an example of, or includes aspects of, the corresponding element described with reference to FIGS. 4-6.

First synthesized image 315 is an example of, or includes aspects of, the corresponding element described with reference to FIGS. 4-6, 14, and 15. Second synthesized image 320 is an example of, or includes aspects of, the corresponding element described with reference to FIGS. 4-6, 14, and 15.

Figure 4:
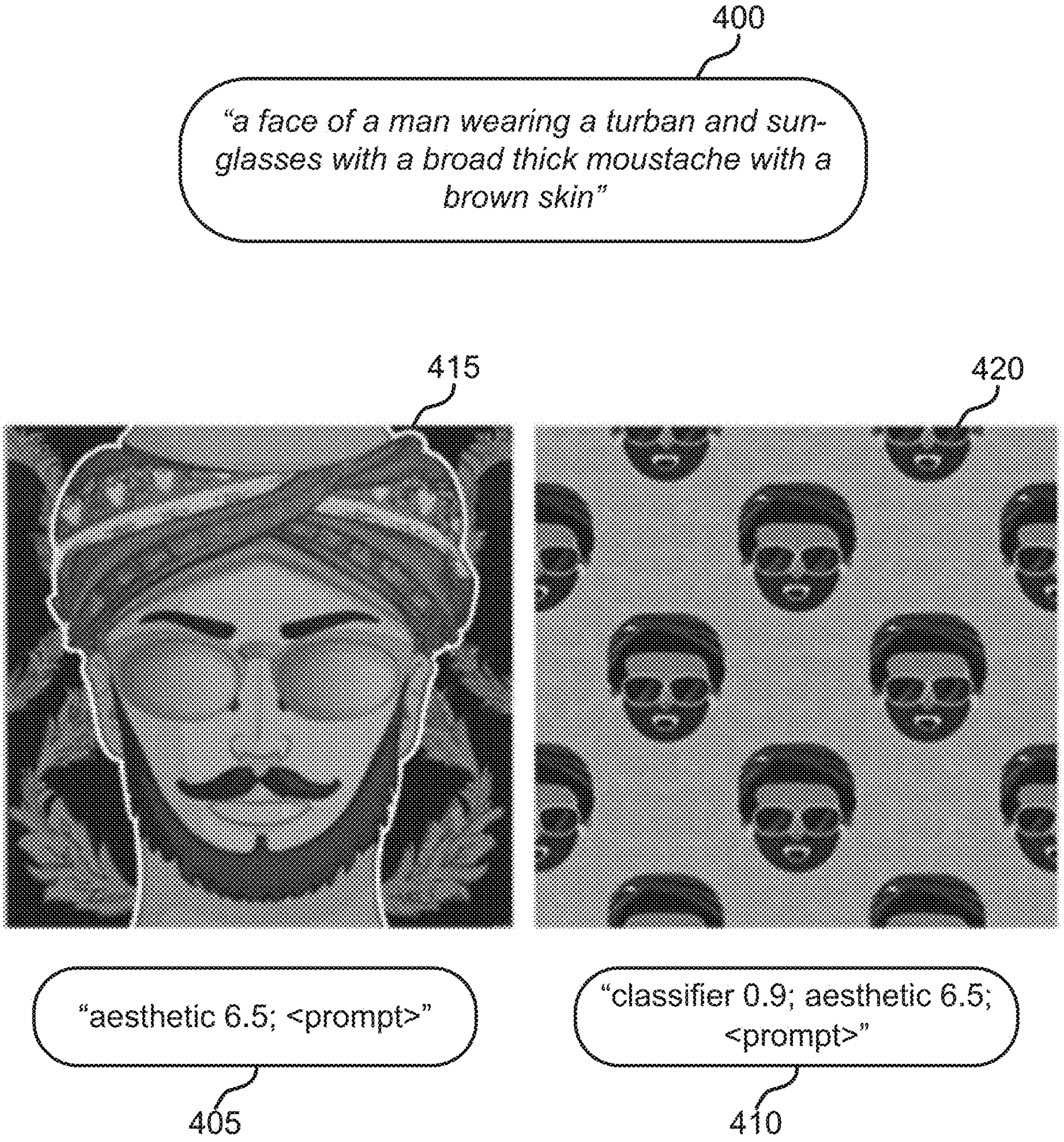

FIG. 4 shows an example of synthesized pattern images according to aspects of the present disclosure. The example shown includes preliminary prompt 400, first input prompt 405, second input prompt 410, first synthesized image 415, and second synthesized image 420.

In some examples, preliminary prompt 400 is "a face of a man wearing a turban and sunglasses with a broad thick moustache with a brown skin". A target level of an image attribute is added to the preliminary prompt 400 to obtain first input prompt 405. First input prompt 405 is "aesthetic 6.5; <prompt>". Here, <prompt> refers to preliminary prompt 400. A machine learning model is trained with aesthetic score(s) and without pattern classifier score(s). At inference time, the machine learning model generates first synthesized image 415 based on first input prompt 405.

In some examples, a target level of an image attribute is added to the preliminary prompt 400 to obtain second input prompt 410. Second input prompt 410 is "classifier 0.9; aesthetic 6.5; <prompt>". Here, <prompt> refers to preliminary prompt 400. A machine learning model is trained with aesthetic score(s) and pattern classifier score(s). At inference time, the machine learning model generates second synthesized image 420 based on second input prompt 410. Second synthesized image 420 shows increased tileability, repeatability, vector image quality compared to first synthesized image 415. The repetition of patterns in second synthesized image 420 is seamless.

Preliminary prompt 400 is an example of, or includes aspects of, the corresponding element described with reference to FIGS. 3, 14, and 15. First input prompt 405 is an example of, or includes aspects of, the corresponding element described with reference to FIGS. 3, 5, and 6. Second input prompt 410 is an example of, or includes aspects of, the corresponding element described with reference to FIGS. 3, 5, and 6.

First synthesized image 415 is an example of, or includes aspects of, the corresponding element described with reference to FIGS. 3, 5, 6, 14, and 15. Second synthesized image 420 is an example of, or includes aspects of, the corresponding element described with reference to FIGS. 3, 5, 6, 14, and 15.

Figure 5:
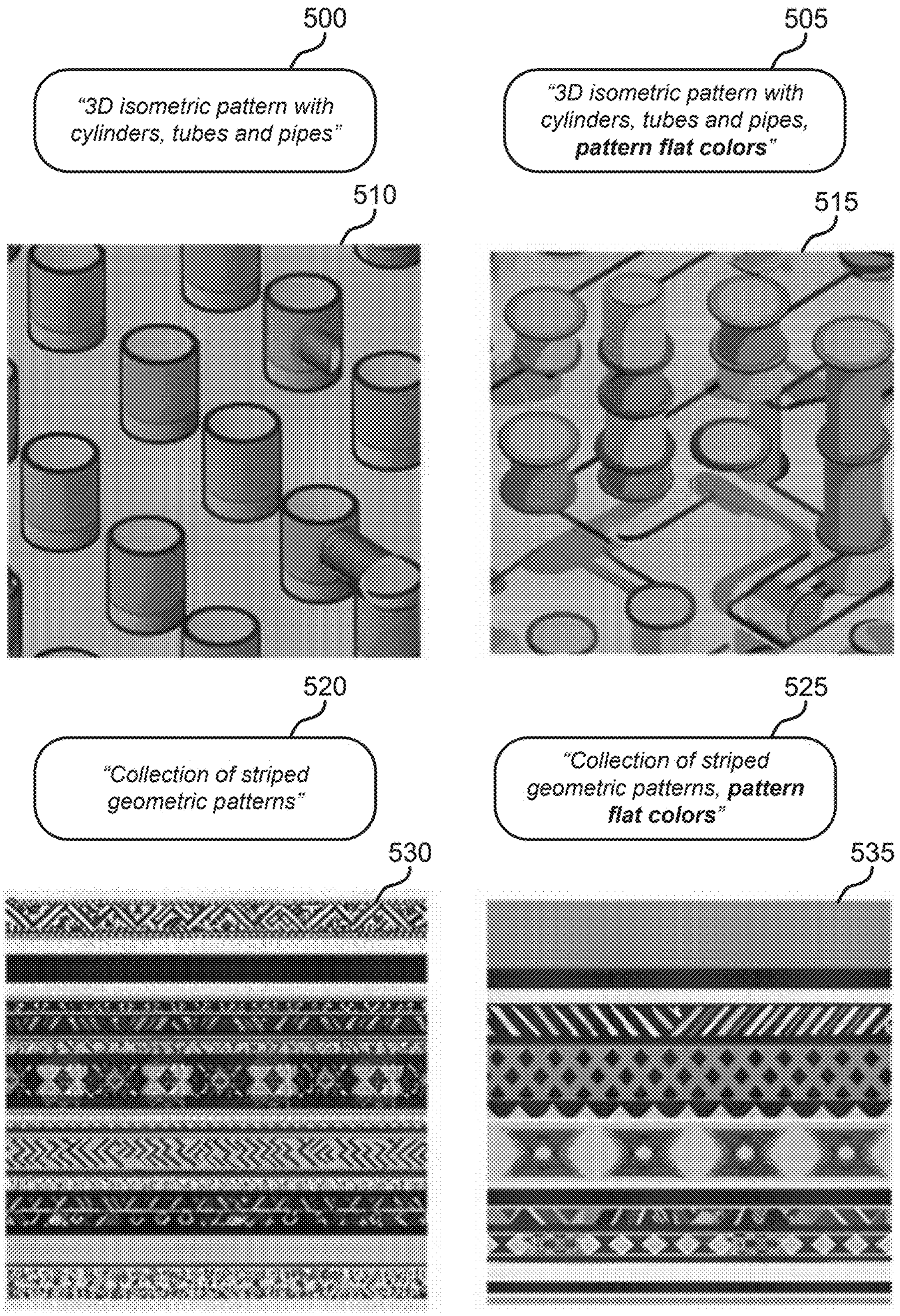

FIG. 5 shows an example of synthesized pattern images according to aspects of the present disclosure. The example shown includes first preliminary prompt 500, first input prompt 505, first synthesized image 510, second synthesized image 515, second preliminary prompt 520, second input prompt 525, third synthesized image 530, and fourth synthesized image 535.

In some cases, due to the complexity in the synthesized patterns, synthesized images may tend to look like hand-drawn and low in quality. To obtain generated patterns that are clean (e.g., fewer to no high frequency components) and vector graphics, a machine learning model appends first preliminary prompt 500 given to a prior model and an image generation model (e.g., U-Net) with phrase "pattern flat colors". Adding the word "pattern" reconfirms that the generated images are repeated patterns as overall structure. Adding the phrase "flat colors" increases quality of the patterns by making them cleaner and flatter. This removes high frequency components in the synthesized images.

In some examples, first preliminary prompt 500 is "3D isometric pattern with cylinders, tubes and pipes". First synthesized image 510 is generated based on first preliminary prompt 500. A pattern attribute (e.g., "pattern flat colors") is added to first preliminary prompt 500 to obtain first input prompt 505. First input prompt 505 is "3D isometric pattern with cylinders, tubes and pipes, pattern flat colors". Second synthesized image 515 is generated based on first input prompt 505.

In some examples, second preliminary prompt 520 is "Collection of striped geometric patterns". Third synthesized image 530 is generated based on second preliminary prompt 520. A pattern attribute (e.g., "pattern flat colors") is added to second preliminary prompt 520 to obtain second input prompt 525. Second input prompt 525 is "Collection of striped geometric patterns, pattern flat colors". Fourth synthesized image 535 is generated based on second input prompt 525.

First preliminary prompt 500 is an example of, or includes aspects of, the corresponding element described with reference to FIG. 6. First input prompt 505 is an example of, or includes aspects of, the corresponding element described with reference to FIGS. 3, 4, and 6. First synthesized image 510 is an example of, or includes aspects of, the corresponding element described with reference to FIGS. 3, 4, 6, 14, and 15.

Second synthesized image 515 is an example of, or includes aspects of, the corresponding element described with reference to FIGS. 3, 4, 6, 14, and 15. Second preliminary prompt 520 is an example of, or includes aspects of, the corresponding element described with reference to FIG. 6. Second input prompt 525 is an example of, or includes aspects of, the corresponding element described with reference to FIGS. 3, 4, and 6.

Figure 6:
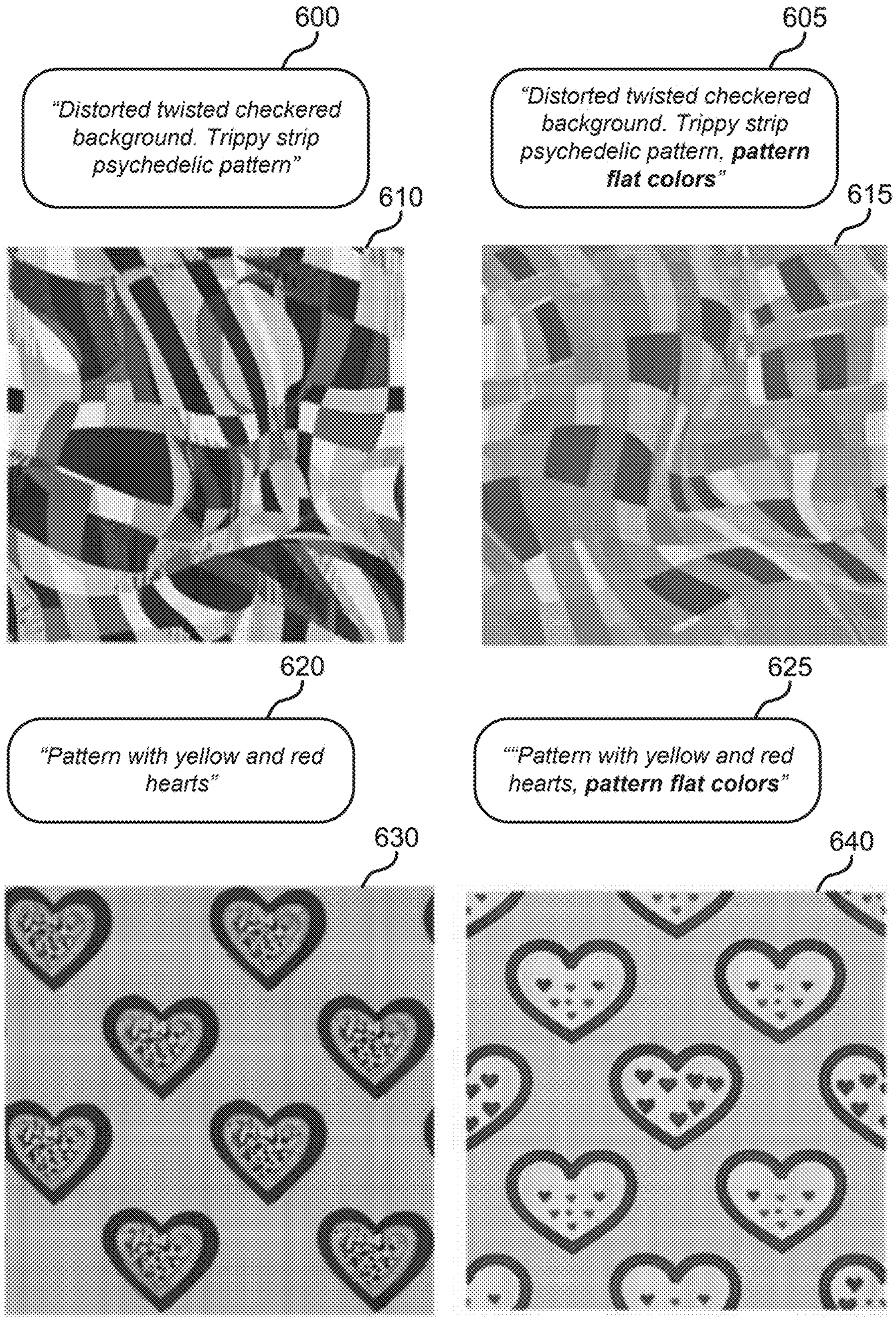

FIG. 6 shows an example of synthesized pattern images according to aspects of the present disclosure. The example shown includes first preliminary prompt 600, first input prompt 605, first synthesized image 610, second synthesized image 615, second preliminary prompt 620, second input prompt 625, third synthesized image 630, and fourth synthesized image 635.

In some examples, first preliminary prompt 600 is "Distorted twisted checkered background. Trippy strip psychedelic pattern". First synthesized image 610 is generated based on first preliminary prompt 600. A pattern attribute (e.g., "pattern flat colors") is added to first preliminary prompt 600 to obtain first input prompt 605. First input prompt 605 is "Distorted twisted checkered background. Trippy strip psychedelic pattern, pattern flat colors". Second synthesized image 615 is generated based on first input prompt 605.

In some examples, second preliminary prompt 620 is "Pattern with yellow and red hearts". Third synthesized image 630 is generated based on second preliminary prompt 620. A pattern attribute (e.g., "pattern flat colors") is added to second preliminary prompt 620 to obtain second input prompt 625. Second input prompt 625 is "Pattern with yellow and red hearts, pattern flat colors". Fourth synthesized image 635 is generated based on second input prompt 625.

First preliminary prompt 600 is an example of, or includes aspects of, the corresponding element described with reference to FIG. 5. First input prompt 605 is an example of, or includes aspects of, the corresponding element described with reference to FIGS. 3-5. First synthesized image 610 is an example of, or includes aspects of, the corresponding element described with reference to FIGS. 3-5, 14, and 15.

Second synthesized image 615 is an example of, or includes aspects of, the corresponding element described with reference to FIGS. 3-5, 14, and 15. Second preliminary prompt 620 is an example of, or includes aspects of, the corresponding element described with reference to FIG. 5. Second input prompt 625 is an example of, or includes aspects of, the corresponding element described with reference to FIGS. 3-5.

Figure 7:
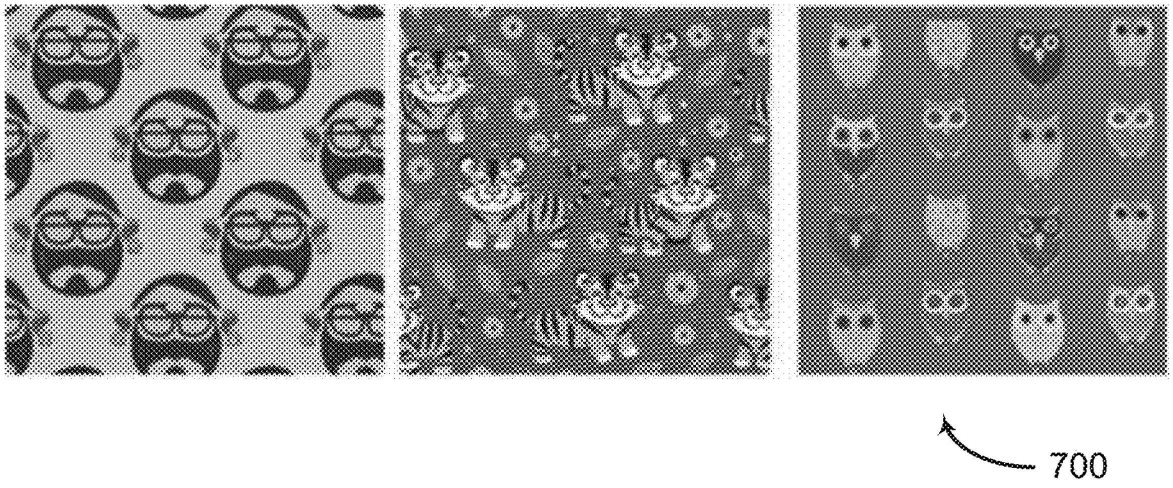
FIG. 7 shows an example of object specific patterns and artistic wallpapers according to aspects of the present disclosure.
Figure 7:

FIG. 7 shows an example of object specific patterns and artistic wallpapers according to aspects of the present disclosure. The example shown includes object specific pattern image(s) 700 and artistic wallpaper image(s) 705.

Figure 10:
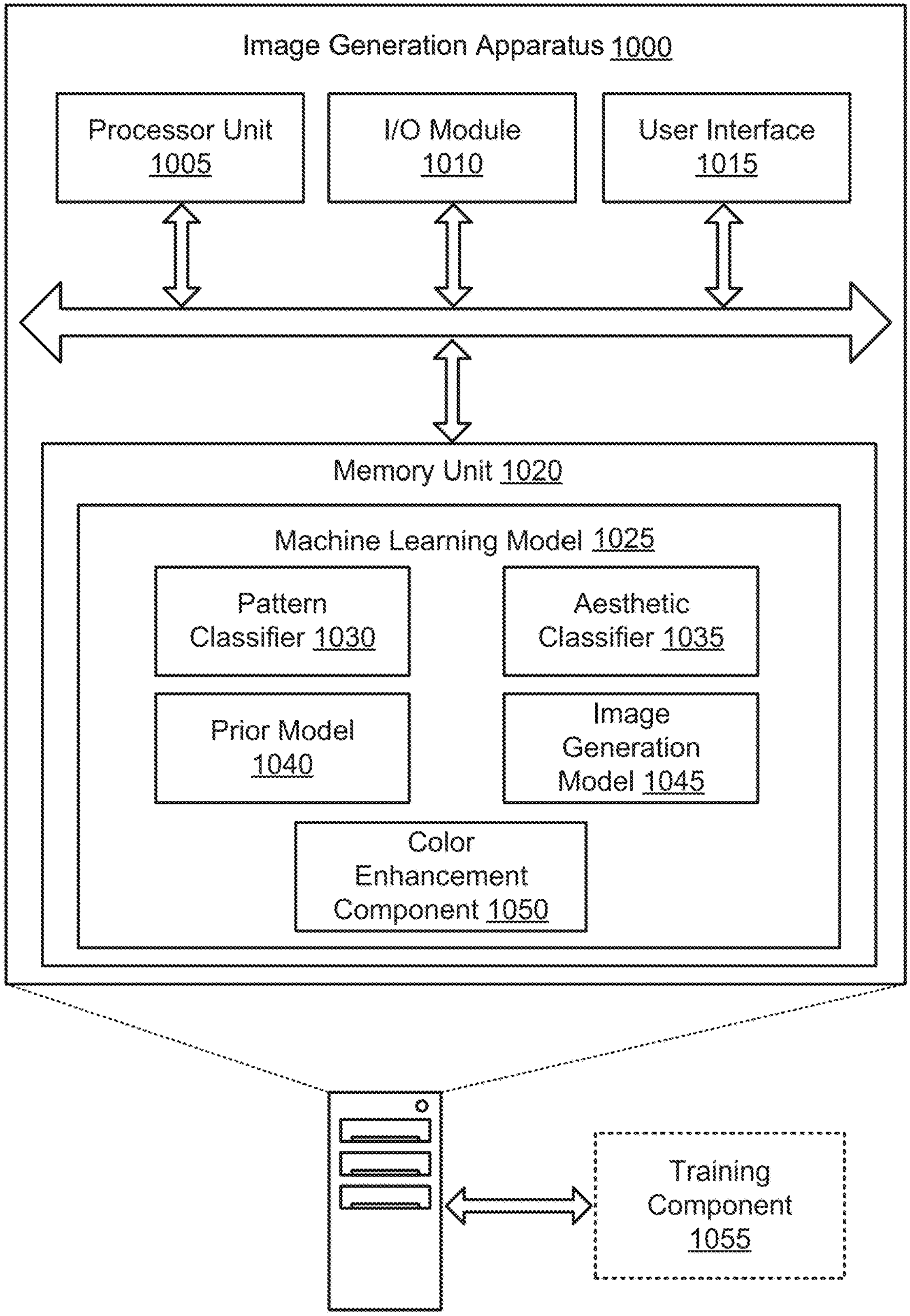
FIG. 10 shows an example of an image generation apparatus according to aspects of the present disclosure.

Embodiments of the present disclosure improve text-to-image alignment and can generate patterns with varied categories based on complex prompts by using the machine learning model (with reference to FIG. 10). The machine learning model can generate object specific pattern images 700 and artistic wallpaper images 705. For example, an input prompt for generating artistic wallpaper images 705 is "a beetle and a butterfly in a children's book style illustration with simple flat colors and small plants around them". The input prompt is a complex and detailed prompt. The machine learning model performs text-to-pattern generation while maintaining aesthetic and tilability quality. In some cases, one or more additional phrases are added to a preliminary prompt to obtain the input prompt. Then the input prompt is fed to a prior model and an image generation model to obtain cleaner and editable patterns. One or more embodiments of the present disclosure involves generating and customizing synthetic patterns by using editing tools (e.g., Adobe® Illustrator).

Figure 8:
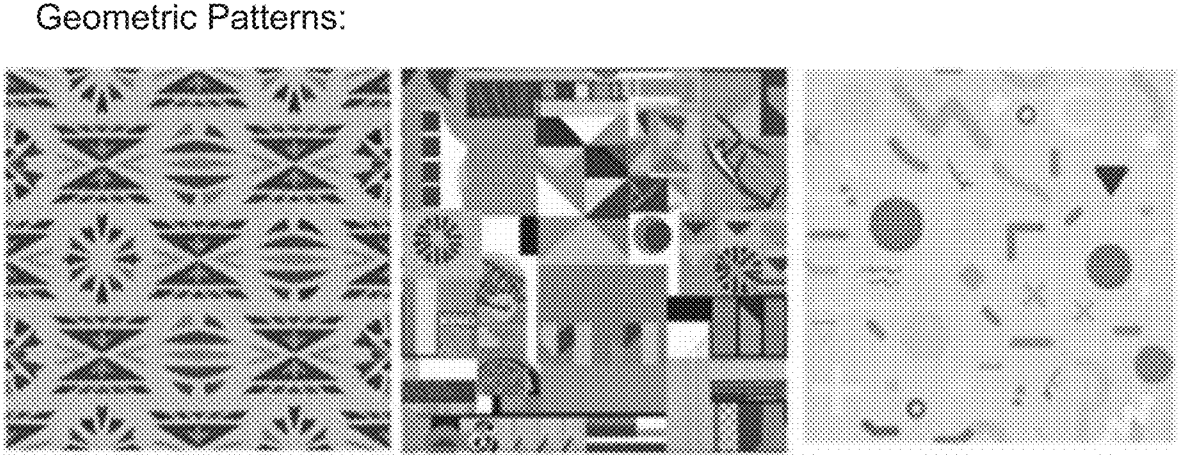
FIG. 8 shows an example of geometric patterns and topical patterns according to aspects of the present disclosure.
Figure 8:
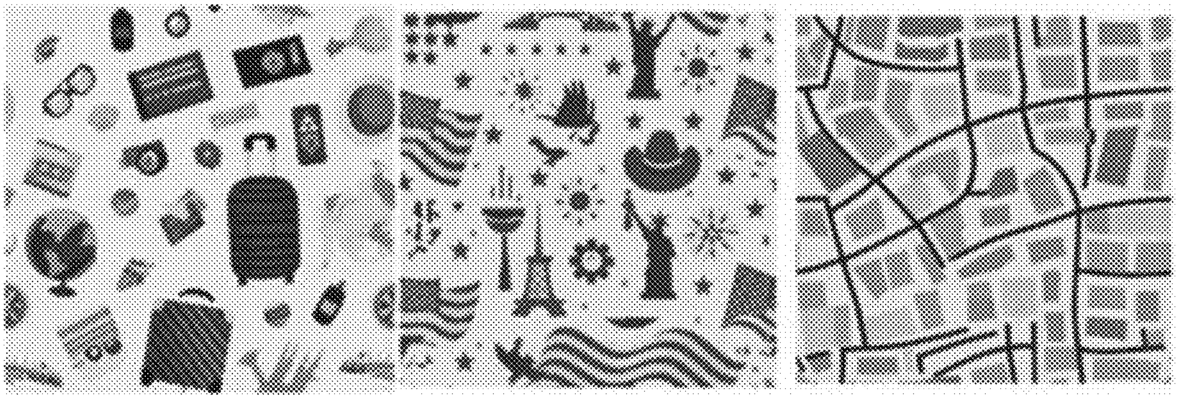

FIG. 8 shows an example of geometric patterns and topical patterns according to aspects of the present disclosure. The example shown includes geometric pattern image(s) 800 and topical pattern image(s) 805. Embodiments of the present disclosure improve text-to-image alignment and can generate patterns with varied categories based on complex prompts by using the machine learning model (with reference to FIG. 10). The machine learning model can generate geometric pattern images 800 and topical pattern images 805.

Figure 9:
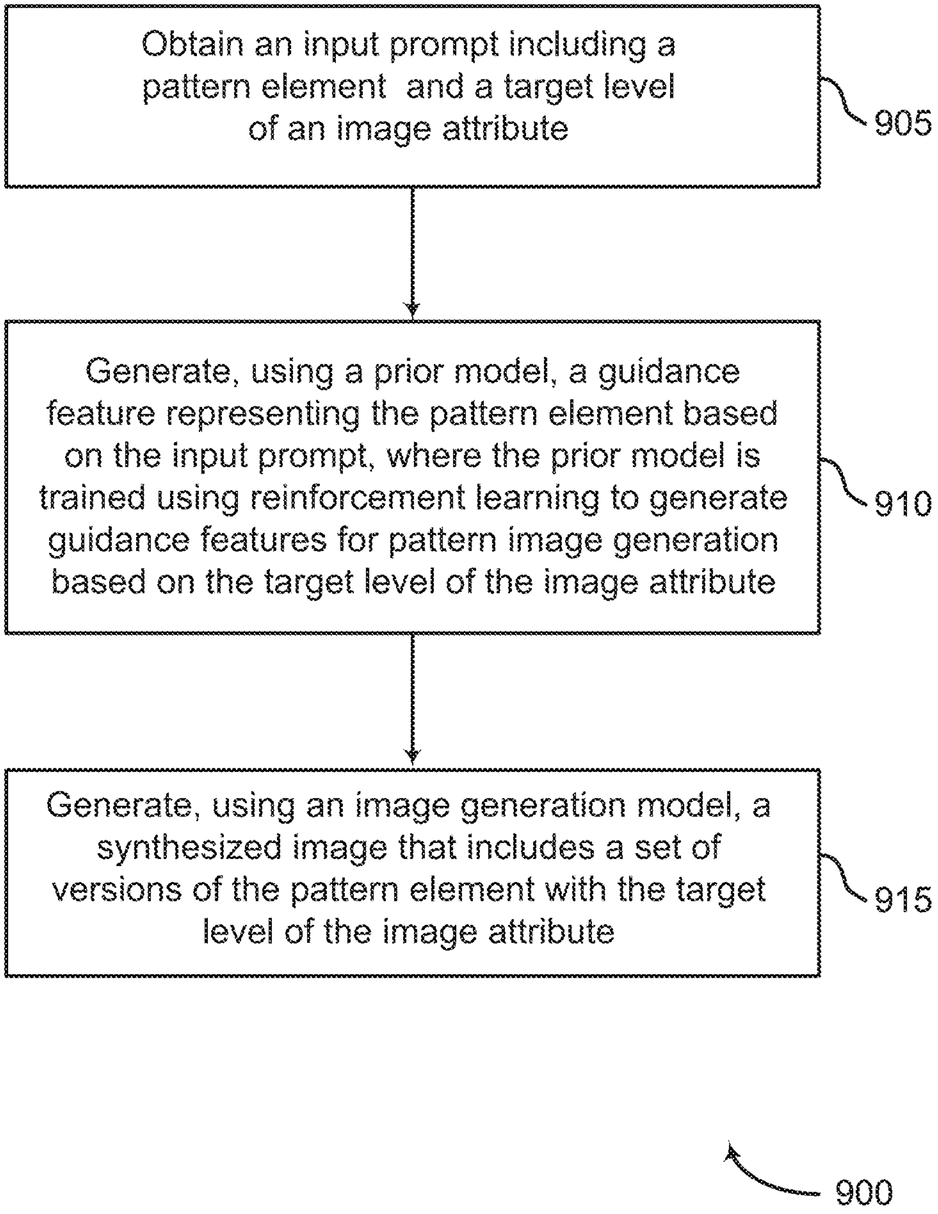
FIG. 9 shows an example of a method for text-to-pattern generation according to aspects of the present disclosure.

FIG. 9 shows an example of a method 900 for text-to-pattern generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains an input prompt including a pattern element and a target level of an image attribute. In some cases, the operations of this step refer to, or may be performed by, a prior model as described with reference to FIGS. 10-12. In some examples, an image attribute includes a pattern classifier attribute, an aesthetic attribute, or both. In some examples, the target level of the image attribute includes a scalar value. For example, a preliminary prompt from a user is "Circus animals". Here, the preliminary prompt includes a pattern element "circus animals". A target level of an image attribute is added to the preliminary prompt. An input prompt fed to a diffusion prior model is "classifier 0.9; aesthetic 6.5; Circus animals". In this example, "classifier 0.9" and "aesthetic 6.5" refer to an aesthetic score and a pattern classifier score, respectively. Here, 0.9 refers to a level of the pattern classifier attribute. 6.5 refers to a level of the aesthetic attribute.

At operation 910, the system generates, using a prior model, a guidance feature representing the pattern element based on the input prompt, where the prior model is trained using reinforcement learning to generate guidance features for pattern image generation based on the target level of the image attribute. In some cases, the operations of this step refer to, or may be performed by, a prior model as described with reference to FIGS. 10-12.

In some embodiments, training and updating a diffusion prior model includes performing a reinforcement learning process based on an objective function. Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical.

In some embodiments, the reinforcement learning includes upside down reinforcement learning ("UDRL" thereinafter) using the image attribute as input. The prior model is provided with a reward for the synthesized images in the input prompt itself. UDRL is applied to train the prior model. This ensures that the prior model maps aesthetics and pattern style to image structure and its elements at inference. UDRL is used to obtain high quality patterns with no photorealistic elements in synthesized images. Once the prior model is trained using UDRL, prompt engineering can lead to repeatable patterns based on a classifier score in an input prompt.

According to some embodiments, an image generation system of the present disclosure uses upside-down reinforcement learning by providing a "reward" (e.g., a phrase representing a target level of an image attribute such as a pattern classifier attribute or an aesthetic attribute) as part of input conditioning for training a prior model. In some cases, a phrase representing a target level of an image attribute may be referred to as an objective text. The objective text is provided based on an output of a classifier model for a training image. In some examples, the classifier model includes a pattern classifier, an aesthetic classifier, or both. The output from the pattern classifier is a pattern classifier score. The output from the aesthetic classifier is an aesthetic score. The pattern classifier score and aesthetic score include a scalar value.

In some cases, the objective text is provided by manually annotating the training image. In some cases, the objective text heavily reduces resource requirements when compared to the resource requirements for conventional reinforcement learning. For example, using the objective text as input conditioning for the prior model avoids using resource-expensive and high-latency reinforcement learning algorithms for training the prior model.

In some cases, the objective text modifies a preliminary text input used for training the prior model, thereby making the "reward" as part of an input text condition for training the prior model. In some cases, the "reward" can be a human-understandable label, unlike reward requirements for conventional reinforcement learning training approaches for diffusion prior models.

For example, "classifier 0.9; aesthetic 6.5; Circus animals" is an example of text prompts including a target level of an image attribute. "Classifier 0.9" and "aesthetic 6.5" refer to a level of a pattern classifier attribute and an aesthetic attribute, respectively. During training, "classifier 0.9" and "aesthetic 6.5" are the objective texts. Here, 0.9 indicates a level of the target "pattern classifier" characteristic while 6.5 indicates a level of the target "aesthetic" characteristic. The scalar values used here are examples and other scalar values are possible and can be set. In some cases, based on the "classifier 0.9; aesthetic 6.5; Circus animals" prompt, the prior model generates a guidance feature based on the target level of the image attribute (e.g., the pattern classifier attribute and the aesthetic attribute). The guidance feature is then input to an image generation model (e.g., a diffusion model) to generate synthesized images depicting a set of versions of the pattern element having a high degree of aesthetics (due to "aesthetic 6.5").

In some examples, the pattern classifier score (obtained via a pattern classifier trained for classification) is used to classify between vector graphic patterns and non-patterns for a set of training images. The pattern classifier score ranges from 0-1 based on the tileability, repeatability, vector quality, etc. In some examples, the aesthetic score (obtained via an aesthetic classifier/scorer) is used to indicate a degree of aesthetics for the set of training images. The aesthetic score ranges from 1-10 where 10 represents a highest aesthetics.

By contrast, conventional image generation models do not understand target levels included in the "classifier 0.9; aesthetic 6.5; Circus animals" prompt, and generate images based on the prompt that may depict the pattern element of circus animals, but without correspondence to the target levels included in the prompt.

At operation 915, the system generates, using an image generation model, a synthesized image based on the guidance feature, where the synthesized image includes a set of versions of the pattern element. In some cases, the operations of this step refer to, or may be performed by, an image generation model as described with reference to FIGS. 10 and 11.

In one or more embodiments, the image generation model includes a diffusion model that works by iteratively adding noise to the data during a forward process and then learning to recover the data by denoising the data during a reverse process. The reverse diffusion process can be guided based on a text prompt, or another guidance prompt, such as an image, a layout, a segmentation map, etc. In some examples, the input prompt is encoded using a text encoder (e.g., a multi-modal encoder) to obtain guidance features in a guidance space. The guidance features can be combined with the noisy features at one or more layers of the reverse diffusion process to ensure that the synthesized image includes the pattern element and the target level of the image attribute described by the input prompt. For example, guidance features can be combined with the noisy features using a cross-attention block within the reverse diffusion process.

Before and during training, different dataset augmentation, dataset sampling and pre-processing methods are used to improve text-to-image alignment and generation quality (e.g., vector graphics quality). In some examples, the phrase "pattern flat colors" is added to a preliminary prompt to obtain an input prompt that is fed to the prior model and the image generation model. The image generation model generates cleaner patterns that enables increased editability (e.g., editing becomes more efficient) when converted to layers.

In some examples, short query dataset is added to obtain a training dataset. Samples from the short query dataset can improve image generation quality for short input prompts.

In FIGS. 1-9, a method, apparatus, and non-transitory computer readable medium for image generation are described. One or more embodiments of the method, apparatus, and non-transitory computer readable medium include obtaining an input prompt comprising a pattern element and a target level of an image attribute; generating, using a prior model, a guidance feature representing the pattern element based on the input prompt, wherein the prior model is trained using reinforcement learning to generate guidance features for pattern image generation based on the target level of the image attribute; and generating, using an image generation model, a synthesized image based on the guidance feature, wherein the synthesized image includes a plurality of versions of the pattern element.

Some examples of the method, apparatus, and non-transitory computer readable medium further include obtaining a preliminary prompt comprising the pattern element. Some examples further include adding the target level of the image attribute to the preliminary prompt.

Some examples of the method, apparatus, and non-transitory computer readable medium further include obtaining a preliminary prompt comprising the pattern element. Some examples further include adding a pattern attribute to the preliminary prompt to obtain an additional prompt, wherein the synthesized image is generated based on the additional prompt.

In some examples, the target level of the image attribute comprises a scalar value. In some examples, the image attribute comprises a pattern classifier attribute. In some examples, the image attribute comprises an aesthetic attribute. In some examples, the reinforcement learning comprises upside down reinforcement learning (UDRL) using the image attribute as input.

Some examples of the method, apparatus, and non-transitory computer readable medium further include performing color enhancement on the synthesized image to obtain an enhanced image having a smaller number of colors than the synthesized image.

Network Architecture

FIG. 10 shows an example of an image generation apparatus 1000 according to aspects of the present disclosure. The example shown includes image generation apparatus 1000, processor unit 1005, I/O module 1010, user interface 1015, memory unit 1020, machine learning model 1025, and training component 1055. Image generation apparatus 1000 is an example of, or includes aspects of, the corresponding element described with reference to FIG. 1.

Processor unit 1005 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, processor unit 1005 is configured to operate a memory array using a memory controller. In other cases, a memory controller is integrated into the processor. In some cases, processor unit 1005 is configured to execute computer-readable instructions stored in a memory to perform various functions. In some embodiments, processor unit 1005 includes special purpose components for modem processing, baseband processing, digital signal processing, or transmission processing.

Examples of memory unit 1020 include random access memory (RAM), read-only memory (ROM), or a hard disk. Examples of memory unit 1020 include solid state memory and a hard disk drive. In some examples, memory unit 1020 is used to store computer-readable, computer-executable software including instructions that, when executed, cause a processor to perform various functions described herein. In some cases, memory unit 1020 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 1020 store information in the form of a logical state.

In some examples, at least one memory unit 1020 includes instructions executable by the at least one processor unit 1005. Memory unit 1020 includes prior model 1040 or stores parameters of prior model 1040. Additionally or alternatively, memory unit 1020 includes image generation model 1045 or stores parameters of image generation model 1045.

I/O module 1010 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 1010 includes a user interface 1015. A user interface 815 may enable a user to interact with a device. In some embodiments, the user interface 1015 may include an audio device, such as an external speaker system, an external display device such as a display screen, or an input device (e.g., remote control device interfaced with the user interface 1015 directly or through an I/O controller module). In some cases, a user interface 1015 may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 1000 includes a computer implemented artificial neural network (ANN) for text-to pattern generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the image generation model 1045 (e.g., a diffusion model) are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 1000 includes a convolutional neural network (CNN) for text-to-pattern generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In one embodiment, machine learning model 1025 includes pattern classifier 1030, aesthetic classifier 1035, prior model 1040, image generation model 1045, and color enhancement component 1050. Machine learning model 1025 is an example of, or includes aspects of, the corresponding element described with reference to FIG. 11.

According to some embodiments, prior model 1040 obtains an input prompt including a pattern element and a target level of an image attribute. In some examples, prior model 1040 generates a guidance feature representing the pattern element based on the input prompt, where the prior model 1040 is trained using reinforcement learning to generate guidance features for pattern image generation based on the image attribute (i.e., based on the target level of the image attribute from the input prompt).

According to some embodiments, prior model 1040 is trained to generate a guidance feature representing a pattern element based on an input prompt comprising the pattern element and a target level of an image attribute, wherein the prior model 1040 is trained using reinforcement learning to generate guidance features for pattern image generation based on the target level of the image attribute. In some examples, the prior model 1040 includes a transformer network and the image generation model 1045 includes a diffusion model. Prior model 1040 is an example of, or includes aspects of, the corresponding element described with reference to FIGS. 11 and 12.

According to some embodiments, machine learning model 1025 obtains a preliminary prompt including the pattern element. In some examples, machine learning model 1025 adds the target level of the image attribute to the preliminary prompt. In some examples, machine learning model 1025 obtains a preliminary prompt including the pattern element. Machine learning model 1025 adds a pattern attribute to the preliminary prompt to obtain an additional prompt, where the synthesized image is generated based on the additional prompt. In some examples, the target level of the image attribute includes a scalar value. In some examples, the image attribute includes a pattern classifier 1030 attribute. In some examples, the image attribute includes an aesthetic attribute. In some examples, the reinforcement learning includes upside down reinforcement learning using the image attribute as input.

According to some embodiments, pattern classifier 1030 is configured to generate a pattern classifier 1030 attribute. Pattern classifier 1030 is an example of, or includes aspects of, the corresponding element described with reference to FIG. 16.

According to some embodiments, aesthetic classifier 1035 is configured to generate an aesthetic attribute. Aesthetic classifier 1035 is an example of, or includes aspects of, the corresponding element described with reference to FIG. 16.

According to some embodiments, image generation model 1045 generates a synthesized image based on the guidance feature, where the synthesized image includes a set of versions of the pattern element.

According to some embodiments, image generation model 1045 generates a synthesized image based on a guidance feature from the prior model 1040, where the synthesized image includes a set of versions of the pattern element.

According to some embodiments, image generation model 1045 is trained to generate a synthesized image based on the guidance feature. Image generation model 1045 is an example of, or includes aspects of, the corresponding element described with reference to FIG. 11.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels, The reverse diffusion process outputs $x_{t-1}$, such as second intermediate image iteratively until $x_T$ is reverted back to $x_0$, the original image. The reverse process can be represented as:

$$p_\theta(x_{t-1} \mid x_t) := N\left(x_{t-1}; \mu_\theta(x_t, t), \sum\nolimits_\theta(x_t, t)\right). \quad (1)$$

The joint probability of a sequence of samples in the Markov chain can be written as a product of conditionals and the marginal probability:

$$x_T : p_\theta(x_{0:T}) := p(x_t)\prod\nolimits_{t=1}^{T} p_\theta(x_{t-1} \mid x_t), \quad (2)$$

where $p(x_T)=N(x_T; 0, I)$ is the pure noise distribution as the reverse process takes the outcome of the forward process, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At inference time, observed data $x_0$ in a pixel space can be mapped into a latent space as input and a generated data $\tilde{x}$ is mapped back into the pixel space from the latent space as output. In some examples, $x_0$, represents an original input image with low image quality, latent variables $x_1, \ldots, x_T$ represent noisy images, and $\tilde{x}$ represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. The training system then updates parameters of the model based on the comparison. For example, parameters of a U-Net may be updated using gradient descent. Time-dependent parameters of the Gaussian transitions can also be learned.

According to some embodiments, color enhancement component 1050 performs color enhancement on the synthesized image to obtain an enhanced image having a smaller number of colors than the synthesized image. Color enhancement component 1050 is an example of, or includes aspects of, the corresponding element described with reference to FIG. 11.

According to some embodiments, training component 1055 obtains a training set including an input prompt including a pattern element and a target level of an image attribute. In some examples, training component 1055 trains, using upside down reinforcement learning on the training set, prior model 1040 to generate guidance features for pattern image generation based on the image attribute. In some examples, the UDRL includes providing the image attribute as input to the prior model 1040. In some examples, training component 1055 pre-trains the prior model 1040 on a preliminary training set having more samples than the training set.

In some examples, training component 1055 trains the image generation model 1045 to generate synthesized images based on the guidance features from the prior model 1040. In some examples, training component 1055 obtains a ground-truth image. Training component 1055 generates the input prompt based on the ground-truth image. In some examples, training component 1055 generates the target level of the image attribute using a classifier model based on the ground-truth image. In some cases, training component 1055 (shown in dashed line) is implemented on an apparatus other than image generation apparatus 1000.

Figure 11:
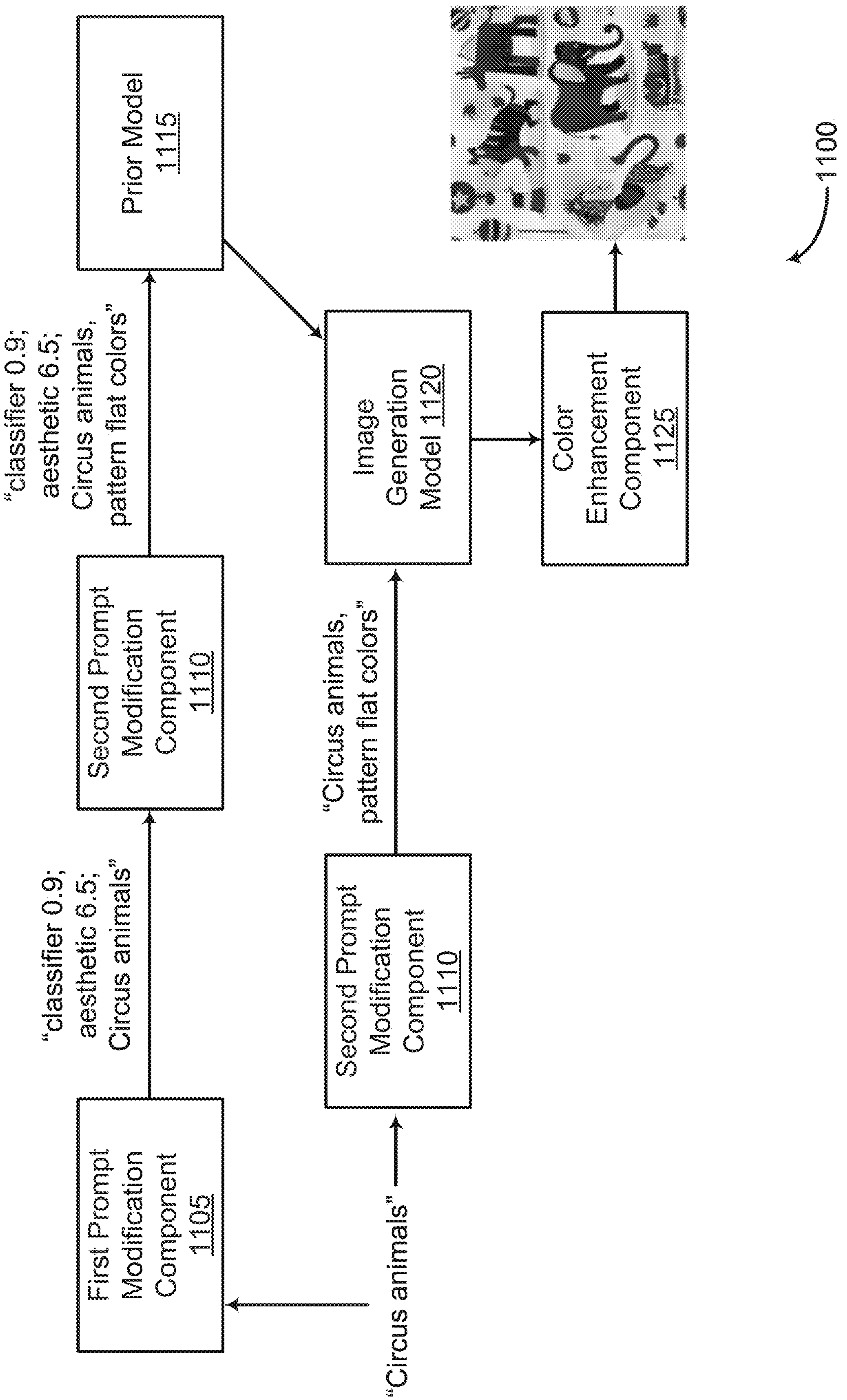
FIG. 11 shows an example of a machine learning model according to aspects of the present disclosure.

FIG. 11 shows an example of a machine learning model 1100 according to aspects of the present disclosure. The example shown includes machine learning model 1100, first prompt modification component 1105, second prompt modification component 1110, prior model 1115, image generation model 1120, and color enhancement component 1125. Machine learning model 1100 is an example of, or includes aspects of, the corresponding element described with reference to FIG. 10.

In an example, a preliminary prompt is “Circus animals” which includes a pattern element (i.e., “circus animal”). The preliminary prompt is input to first prompt modification component 1105. A target level of an image attribute is added to the preliminary prompt. First prompt modification component 1105 modified the preliminary prompt to obtain a modified prompt, e.g., “classifier 0.9; aesthetic 6.5; Circus animals”. The modified prompt is then input to second prompt modification component 1110. Second prompt modification component 1110 adds a pattern attribute (e.g., “pattern flat colors”) to the end of the modified prompt to obtain an input prompt. For example, the input prompt is “classifier 0.9; aesthetic 6.5; Circus animals, pattern flat colors”.

Prior model 1115 takes the input prompt and generates an image embedding based the input prompt. Prior model 1115 samples from a conditional probability distribution. In an embodiment, prior model 1115 samples from two distinct yet interconnected conditional probability distributions. First, consider the distribution of image latent codes derived from a curated dataset of vector graphic patterns represented as P(X|Y), where $X \in \mathbb{R}^{1024}$ symbolizes the image latent vector, and Y is the associated text string. Prior model 1115 is trained to generate samples $X_i$ from this distribution. In some cases, prior model 1115 may be referred to as a diffusion prior model.

In an embodiment, image generation model 1120 (e.g., a diffusion model) is conditioned to model the distribution P(I|X, Y), where I denotes 128×128 RGB image. Image generation model 1120 receives an image embedding from prior model 1115 as input. The image latents $X_i$, which have been derived from the vector graphic patterns in the dataset, are input to the diffusion model. The output from image generation model 1120 is an image that not only resembles the visual characteristics of the vector graphic patterns but also aligns with the input prompt Y. To ensure diversity and alignment with the text condition (e.g., a text prompt), prior model 1115 oversamples 8 latent vectors graphic patterns $X_i$ for a given text prompt Y. Prior model 1115 computes a dot product between the CLIP embedding $Y_{clip}$ of the text prompt and each oversampled image latent $X_{i\ clip}$, normalized by their magnitudes to compute the cosine similarity:

$$s_i = Y_{clip} \cdot X_{i\,clip} \|Y_{clip}\|\ \|X_{i\,clip}\| \tag{3}$$

A number of latents $X_i$ with the highest similarity scores $s_i$ are selected and fed to the image generation model 1120 for generating patterns (e.g., the top four latent codes could be selected). Machine learning model 1100 improves the correlation of the output patterns with the input text condition (e.g., "Circus animals").

Contrastive language-image pre-training (CLIP) is a method of learning from natural language supervision. CLIP provides a joint image and text embedding model trained using a large number of image and text pairs in a self-supervised way. CLIP model maps both text and images to the same embedding space. Prior model 1115 is an example of, or includes aspects of, the corresponding element described with reference to FIGS. 10 and 12. Image generation model 1120 is an example of, or includes aspects of, the corresponding element described with reference to FIG. 10.

In some examples, the preliminary prompt is input to second prompt modification component 1110 which outputs an additional prompt, e.g., "Circus animals, pattern flat colors". The additional prompt is input to image generation model 1120.

In an embodiment, image generation model 1120 generates a synthesized image based on the image embedding and the additional prompt. For post-processing, color enhancement component 1125 performs color enhancement on the synthesized image to obtain an enhanced image having a smaller number of colors than the synthesized image.

In some cases, color enhancement component 1125 reduces or puts a constraint on the number of colors in the generated patterns to further improve the flatness for better editability. Color enhancement component 1125 is an example of, or includes aspects of, the corresponding element described with reference to FIG. 10.

Due to the complexity in generated patterns, a synthesized image may look like hand-drawn and has relatively poor quality. To obtain clean generated patterns (fewer to no high frequency components) and vector graphics, machine learning model 1100 appends prompts fed to prior model 1115 and image generation model 1120 with "pattern flat colors". Adding the word "pattern" reconfirms that the synthesized images are repeated patterns as overall structure and adding the phrase "flat colors" improves the quality of synthesized patterns by making them cleaner and flatter. Machine learning model 1100, by adding "pattern flat colors" to a preliminary prompt, removes high-frequency components in synthesized images that make editing task relatively easy.

Figure 12:
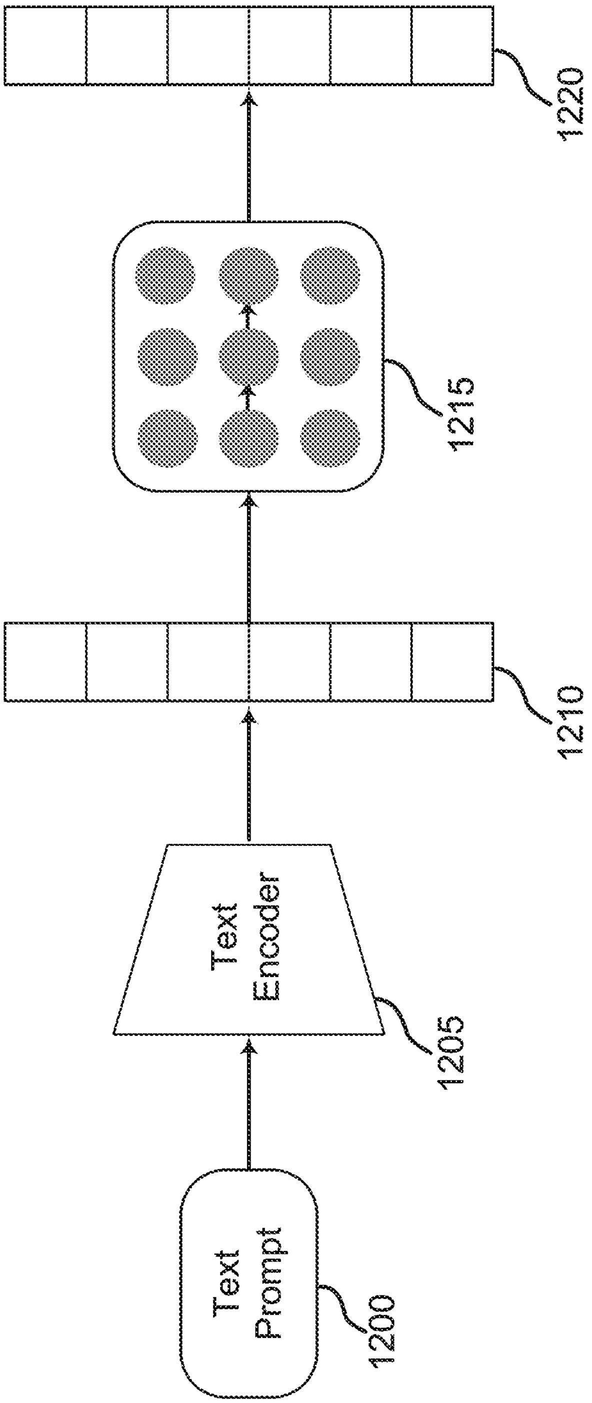
FIG. 12 shows an example of a prior model according to aspects of the present disclosure.

FIG. 12 shows an example of a prior model 1215 according to aspects of the present disclosure. The example shown includes text prompt 1200, multi-modal encoder 1205, text embedding 1210, prior model 1215, and image embedding 1220. Prior model 1215 is an example of, or includes aspects of, the corresponding element described with reference to FIGS. 10 and 11. In some cases, prior model 1215 may be referred to as a diffusion prior model.

In some embodiments, prior model 1215 includes a diffusion-based mapping function that learns a target embedding when conditioned on a source embedding. For example, prior model 1215 is conditioned on text embedding 1210 to predict a corresponding image embedding 1220. In some cases, the input conditioning is not limited to text conditioning, and may be replaced or augmented by other types of embeddings. For example, other types of embeddings include but are not limited to style embeddings of the image, tag embeddings, and sketch embeddings. These embeddings, with or without text embedding 1210, are input to prior model 1215 to predict a corresponding image embedding 1220.

In one embodiment, multi-modal encoder 1205 receives text prompt 1200 and generates text embedding 1210. In some cases, other embeddings such as style embedding, tag embedding, and/or sketch embedding are input into prior model 1215 together with text embedding 1210. Diffusion prior model 1215 received text embedding 1210 and one or more additional embeddings (of different modality or type) to generate image embedding 1220.

In an embodiment, prior model 1215 generates a set of image embeddings based on the text embedding 1210. Prior model 1215 scores and ranks the set of image embeddings by comparing each image embedding of image embeddings 1220 to text embedding 1210. In an embodiment, prior model 1215 calculates a similarity score between the text embedding 1210 and each image embedding of image embeddings 1220 and selects one or more image embeddings 1220 with the highest similarity score (e.g., select top k image embeddings that correspond to the top k highest similarity scores). A high similarity score shows that image embedding 1220 is similar to text embedding 1210 in a common embedding space. Text embedding 1210 and image embedding 1220 are in a multi-modal embedding space. For example, prior model 1215 ranks the set of image embeddings and selects an image embedding that is closest to the text CLIP embedding.

In an embodiment, prior model 1215 receives different types of input prompts. Prior model 1215 receives a text prompt, where the text prompt includes a word, a short phrase, or a long sentence. Multi-modal encoder 1205 encodes a text prompt to obtain a text embedding (e.g., text embedding 1210). In some examples, prior model 1215 receives a noisy image embedding and generates image embedding 1220 based on the text embedding by performing a diffusion process on the noisy image embedding.

Multi-modal encoder 1205 is an example of, or includes aspects of, the corresponding element described with reference to FIG. 13. Text prompt 1200 is an example of, or includes aspects of, the corresponding element described with reference to FIGS. 3-6 and 14-15. Image embedding 1220 is an example of, or includes aspects of, the corresponding element described with reference to FIGS. 11 and 13.

Figure 13:
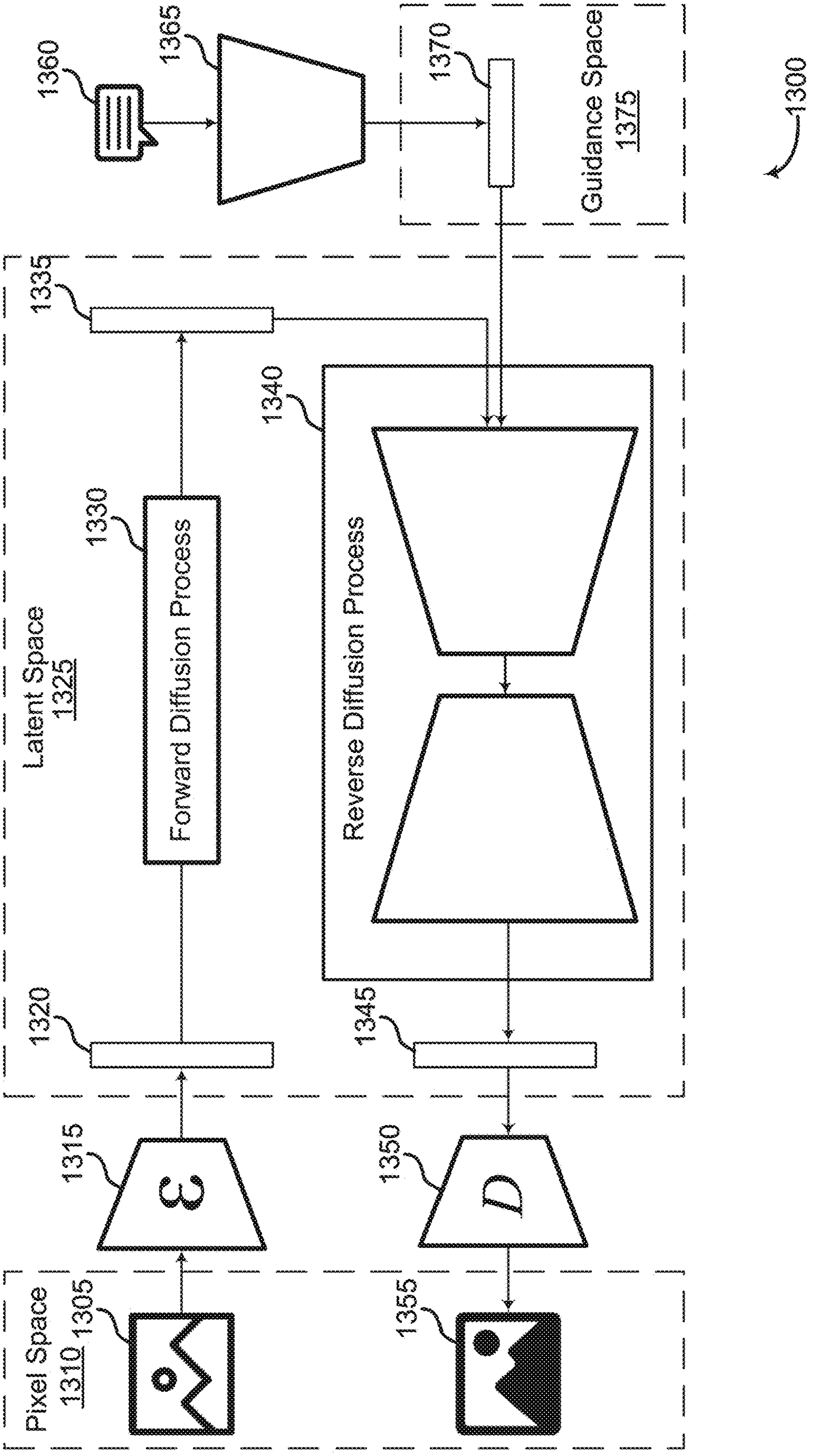
FIG. 13 shows an example of a guided latent diffusion model according to aspects of the present disclosure.

FIG. 13 shows an example of a guided latent diffusion model 1300 according to aspects of the present disclosure.

The guided latent diffusion model 1300 depicted in FIG. 13 is an example of, or includes aspects of, the corresponding element (i.e., image generation model 1045) described with reference to FIG. 10.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1300 may take an original image 1305 in a pixel space 1310 as input and apply and image encoder 1315 to convert original image 1305 into original image features 1320 in a latent space 1325. Then, a forward diffusion process 1330 gradually adds noise to the original image features 1320 to obtain noisy features 1335 (also in latent space 1325) at various noise levels.

Next, a reverse diffusion process 1340 (e.g., a U-Net ANN) gradually removes the noise from the noisy features 1335 at the various noise levels to obtain denoised image features 1345 in latent space 1325. In some examples, the denoised image features 1345 are compared to the original image features 1320 at each of the various noise levels, and parameters of the reverse diffusion process 1340 of the diffusion model are updated based on the comparison. Finally, an image decoder 1350 decodes the denoised image features 1345 to obtain an output image 1355 in pixel space 1310. In some cases, an output image 1355 is created at each of the various noise levels. The output image 1355 can be compared to the original image 1305 to train the reverse diffusion process 1340.

In some cases, image encoder 1315 and image decoder 1350 are pre-trained prior to training the reverse diffusion process 1340. In some examples, they are trained jointly, or the image encoder 1315 and image decoder 1350 and fine-tuned jointly with the reverse diffusion process 1340.

The reverse diffusion process 1340 can also be guided based on a text prompt 1360, or another guidance prompt, such as an image, a layout, a segmentation map, etc. The text prompt 1360 can be encoded using a text encoder 1365 (e.g., a multimodal encoder) to obtain guidance features 1370 in guidance space 1375. The guidance features 1370 can be combined with the noisy features 1335 at one or more layers of the reverse diffusion process 1340 to ensure that the output image 1355 includes content described by the text prompt 1360. For example, guidance features 1370 can be combined with the noisy features 1335 using a cross-attention block within the reverse diffusion process 1340.

Figure 14:
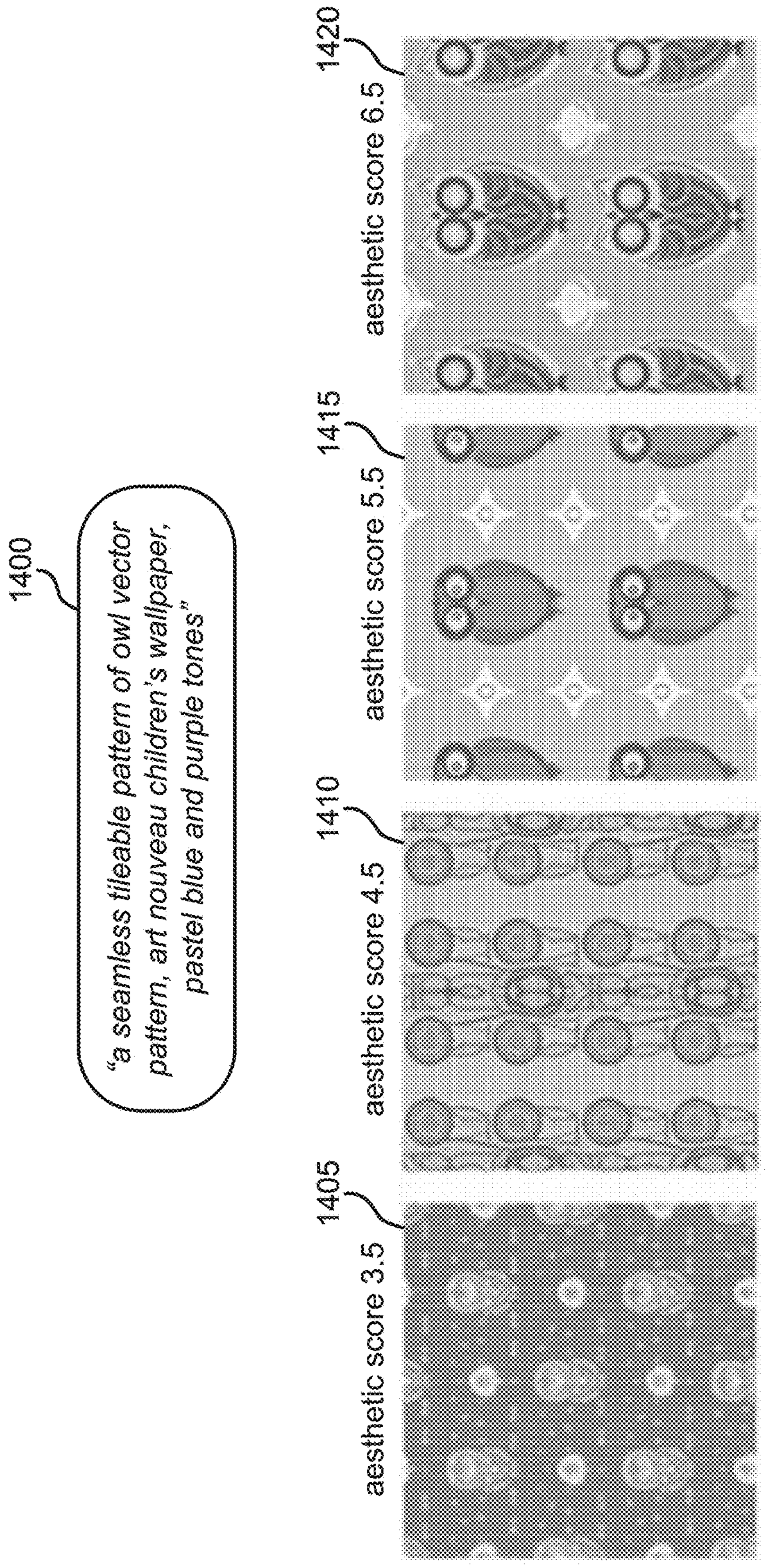
FIGS. 14 and 15 show examples of aesthetic scores effect according to aspects of the present disclosure.

FIG. 14 shows an example of aesthetic scores effect according to aspects of the present disclosure. The example shown includes preliminary prompt 1400, first synthesized image 1405, second synthesized image 1410, third synthesized image 1415, and fourth synthesized image 1420.

In some examples, preliminary prompt 1400 is "a seamless tileable pattern of owl vector pattern, art nouveau children's wallpaper, pastel blue and purple tones". A machine learning model (e.g., machine learning model 1025 with reference to FIG. 10) adds a target level of an image attribute to the preliminary prompt 1400. The machine learning model adds "aesthetic 3.5" (i.e., aesthetic score is 3.5) to the preliminary prompt 1400 to obtain an input prompt. First synthesized image 1405 is generated based on the input prompt.

In some examples, the machine learning model adds "aesthetic 4.5" (i.e., aesthetic score is 4.5) to the preliminary prompt 1400 to obtain an input prompt. Second synthesized image 1410 is generated based on the input prompt.

In some examples, the machine learning model adds "aesthetic 5.5" (i.e., aesthetic score is 5.5) to the preliminary prompt 1400 to obtain an input prompt. Third synthesized image 1415 is generated based on the input prompt.

In some examples, the machine learning model adds "aesthetic 6.5" (i.e., aesthetic score is 6.5) to the preliminary prompt 1400 to obtain an input prompt. Fourth synthesized image 1420 is generated based on the input prompt.

Preliminary prompt 1400 is an example of, or includes aspects of, the corresponding element described with reference to FIGS. 3, 4, and 15. First synthesized image 1405 is an example of, or includes aspects of, the corresponding element described with reference to FIGS. 3-6, and 15. Second synthesized image 1410 is an example of, or includes aspects of, the corresponding element described with reference to FIGS. 3-6, and 15.

Figure 15:
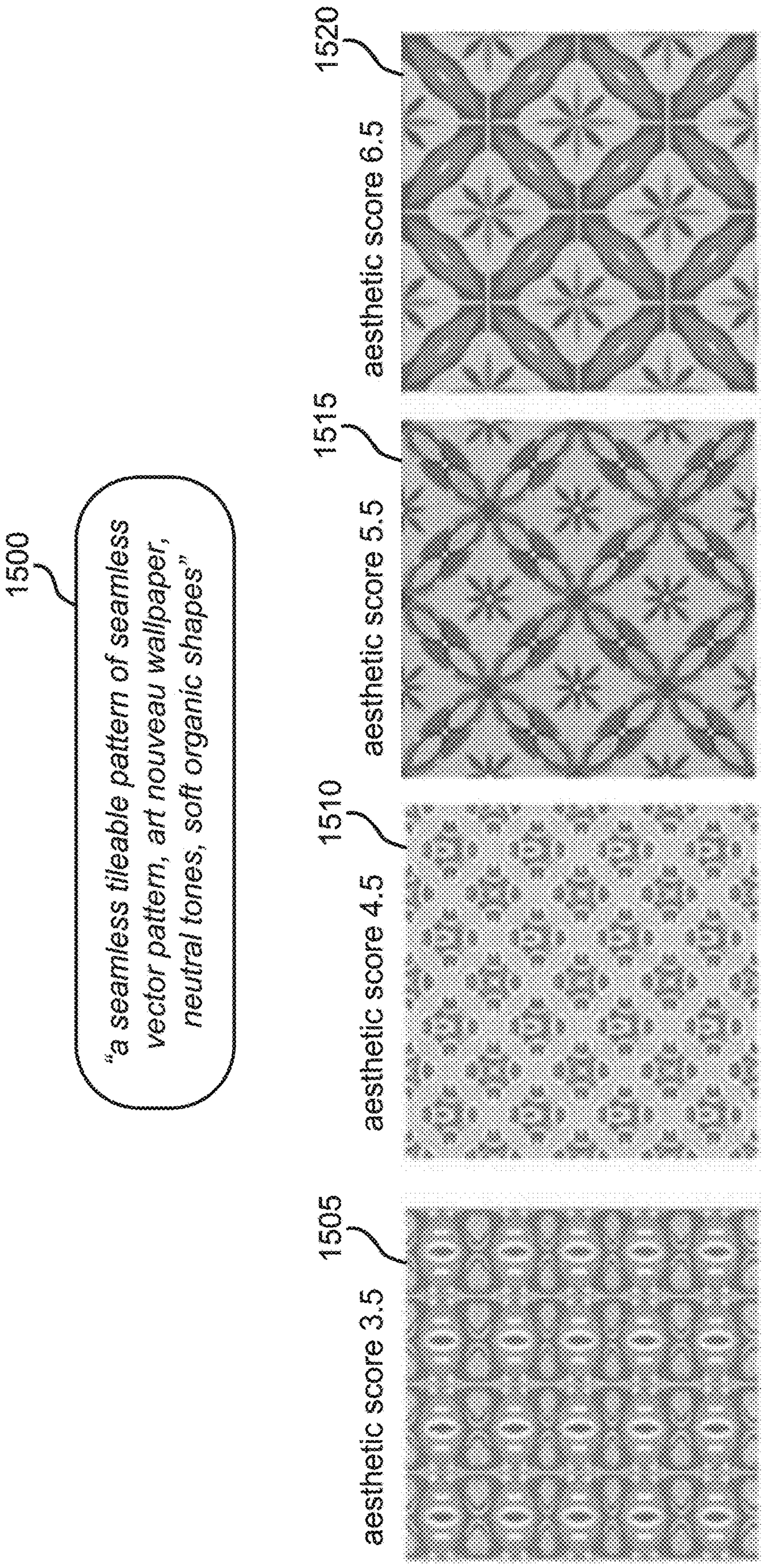

FIG. 15 shows an example of aesthetic scores effect according to aspects of the present disclosure. The example shown includes preliminary prompt 1500, first synthesized image 1505, second synthesized image 1510, third synthesized image 1515, and fourth synthesized image 1520.

In some examples, preliminary prompt 1500 is "a seamless tileable pattern of seamless vector pattern, art nouveau wallpaper, neutral tones, soft organic shapes". A machine learning model (e.g., machine learning model 1025 with reference to FIG. 10) adds a target level of an image attribute to the preliminary prompt 1500. The machine learning model adds "aesthetic 3.5" (i.e., aesthetic score is 3.5) to the preliminary prompt 1500 to obtain an input prompt. First synthesized image 1505 is generated based on the input prompt.

In some examples, the machine learning model adds "aesthetic 4.5" (i.e., aesthetic score is 4.5) to the preliminary prompt 1500 to obtain an input prompt. Second synthesized image 1510 is generated based on the input prompt.

In some examples, the machine learning model adds "aesthetic 5.5" (i.e., aesthetic score is 5.5) to the preliminary prompt 1500 to obtain an input prompt. Third synthesized image 1515 is generated based on the input prompt.

In some examples, the machine learning model adds "aesthetic 6.5" (i.e., aesthetic score is 6.5) to the preliminary prompt 1500 to obtain an input prompt. Fourth synthesized image 1520 is generated based on the input prompt.

Preliminary prompt 1500 is an example of, or includes aspects of, the corresponding element described with reference to FIGS. 3, 4, and 14. First synthesized image 1505 is an example of, or includes aspects of, the corresponding element described with reference to FIGS. 3-6, and 14. Second synthesized image 1510 is an example of, or includes aspects of, the corresponding element described with reference to FIGS. 3-6, and 14.

In FIGS. 10-15, an apparatus and method for image generation are described. One or more embodiments of the apparatus and method include at least one processor; at least one memory including instructions executable by the at least one processor; a prior model comprising parameters in the at least one memory and trained to generate a guidance feature representing a pattern element based on an input prompt comprising the pattern element and a target level of an image attribute, where the prior model is trained using reinforcement learning to generate guidance features for pattern image generation based on the target level of the image attribute; and an image generation model comprising parameters in the at least one memory and trained to generate a synthesized image based on the guidance feature, where the synthesized image includes a plurality of versions of the pattern element.

In some examples, the prior model comprises a transformer network and the image generation model comprises a diffusion model. Some examples of the apparatus and method further include a color enhancement component configured to perform color enhancement on the synthesized image to obtain an enhanced image having a smaller number of colors than the synthesized image.

Some examples of the apparatus and method further include a pattern classifier configured to generate a pattern classifier attribute. Some examples of the apparatus and method further include an aesthetic classifier configured to generate an aesthetic attribute.

Dataset Curation, Training and Evaluation

Figure 16:
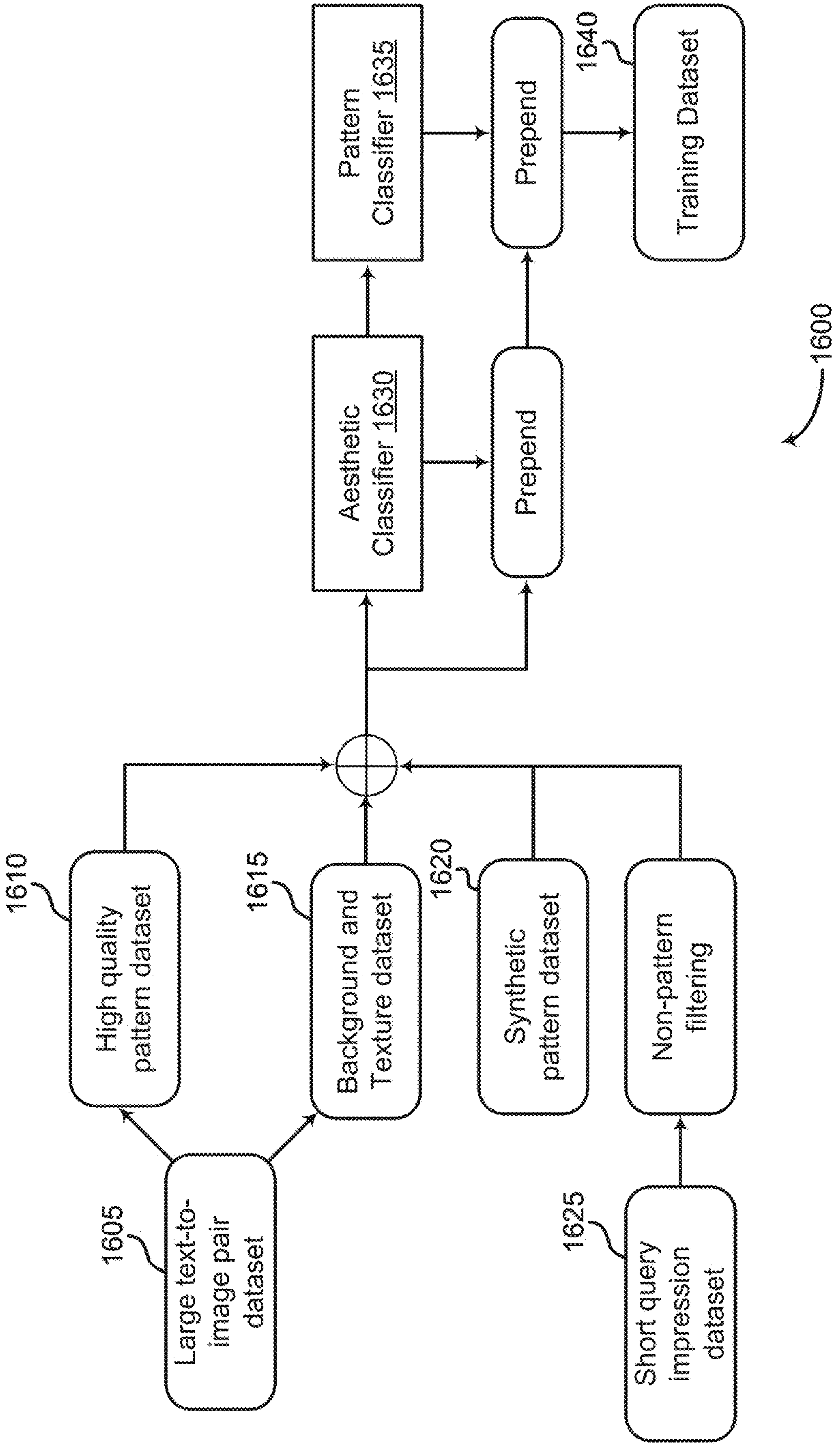
FIG. 16 shows an example of a dataset processing model according to aspects of the present disclosure.

FIG. 16 shows an example of a dataset processing model 1600 according to aspects of the present disclosure. The example shown includes dataset processing model 1600, text-to-image pair dataset 1605, pattern dataset 1610, background and texture dataset 1615, synthetic pattern dataset 1620, short query impression dataset 1625, aesthetic classifier 1630, pattern classifier 1635, and training dataset 1640.

In an embodiment, dataset processing model 1600 is configured to perform dataset pre-processing and sampling. Filtering large amount of vector graphic patterns is difficult and dataset processing model 1600 relates to collecting and creating aesthetic complex patterns. In some examples, from a corpus of 300M Adobe® Stock dataset, dataset processing model 1600 extracts 6M high-quality patterns in swatch elements (e.g., pattern dataset 1610).

In one or more embodiments, dataset processing model 1600, using a combination of text-to-image pair dataset 1605, pattern dataset 1610, background and texture dataset 1615, synthetic pattern dataset 1620, and short query impression dataset 1625, to prepare a large set of training samples for training a prior model such that the prior model is trained on a broad set of concepts and their combinations. This way, text-to-image alignment is improved.

In an embodiment, dataset processing model 1600 obtains background and texture dataset 1615. The background and texture dataset 1615 includes text-image pairs comprising background images and texture images. Background and texture dataset 1615 is obtained by gathering samples with "background" or "texture" in them or by performing clustering to identify images which do not have a dominant foreground object in them.

In an embodiment, a prior model is pre-trained with entire Adobe® Stock corpus. For example, the prior model is trained on the entire Adobe® Stock corpus of approximately 300M samples. The prior model is fine-tuned. This makes the prior model efficient with an exhaustive list of concepts a user wants to generate. After the prior model has converged, then the prior model is trained with pattern dataset 1610 and background and texture dataset 1615 to confine the model towards the domain.

In an embodiment, dataset processing model 1600 obtains synthetic pattern dataset 1620. The synthetic pattern dataset 1620 includes additional concepts as repeated patterns. In some examples, synthetic pattern dataset 1620 includes geometric synthetic samples for training the model to generate refined geometric patterns.

In an embodiment, dataset processing model 1600 obtains short query impression dataset 1625. A short query and impression collection workflow is used to collect short query training samples from a large text-to-image pair dataset. Dataset processing model 1600 filters out impressions not present in the pattern dataset 1610 and the background and texture dataset 1615. Dataset processing model 1600 then obtains training samples with short queries and images which are vector graphic patterns.

Dataset processing model 1600 generates patterns for a wide range of concepts with varied designs and representations. In some cases, to generate clean, tileable and repeatable patterns, dataset processing model 1600 oversamples pattern dataset 1610. Training the prior model with background dataset moves the distribution away from vector graphic patterns. The prior model may generate an image embedding that lies in an embedding space away from the embedding space of the pattern dataset 1610, which in turn conditions the image generation model (e.g., a U-Net) to generate non-patterns. To avoid this, dataset processing model 1600 oversamples the pattern dataset 2 to 3 times more than the background dataset during training. This way the prior model is regulated more heavily by pattern dataset 1610, shifting its distribution towards pattern designs and formats.

During training, some embodiments of the present disclosure perform UDRL on the prior model training. Dataset processing model 1600 adds two scores as part of the text condition fed to the prior model. Aesthetic classifier 1630 outputs an aesthetic score. Aesthetic classifier 1630 generates an aesthetic score for each of the samples using LAION aesthetic scorer. Aesthetic scores range from 1 to 10 where 10 represents highest aesthetics.

Pattern classifier 1635 outputs a pattern classifier score. Pattern classifier 1635 is trained to classify between vector graphic patterns and non-patterns to generate a pattern classifier score for each of the samples. Pattern classifier scores range from 0 to 1 based on the tileability, repeatability, vector quality, etc.

Dataset processing model 1600 is configured to prepend the two scores to input prompts before training the prior model. Additionally, dataset processing model 1600 randomly drops the scores to ensure the model can perform well when one of the two scores or both scores are not provided at inference time. An example of a training input prompt is "classifier 0.9; aesthetic 5.5; A wallpaper with circus animals". During inference, the machine learning model adds one of the two scores or both scores in the backend to an input prompt with their highest values to obtain the best aesthetics and guarantee tilability and vector graphic patterns as outputs. In some examples, adding the pattern classifier score during inference improves pattern quality.

Aesthetic classifier 1630 is an example of, or includes aspects of, the corresponding element described with reference to FIG. 10. Pattern classifier 1635 is an example of, or includes aspects of, the corresponding element described with reference to FIG. 10.

Figure 17:
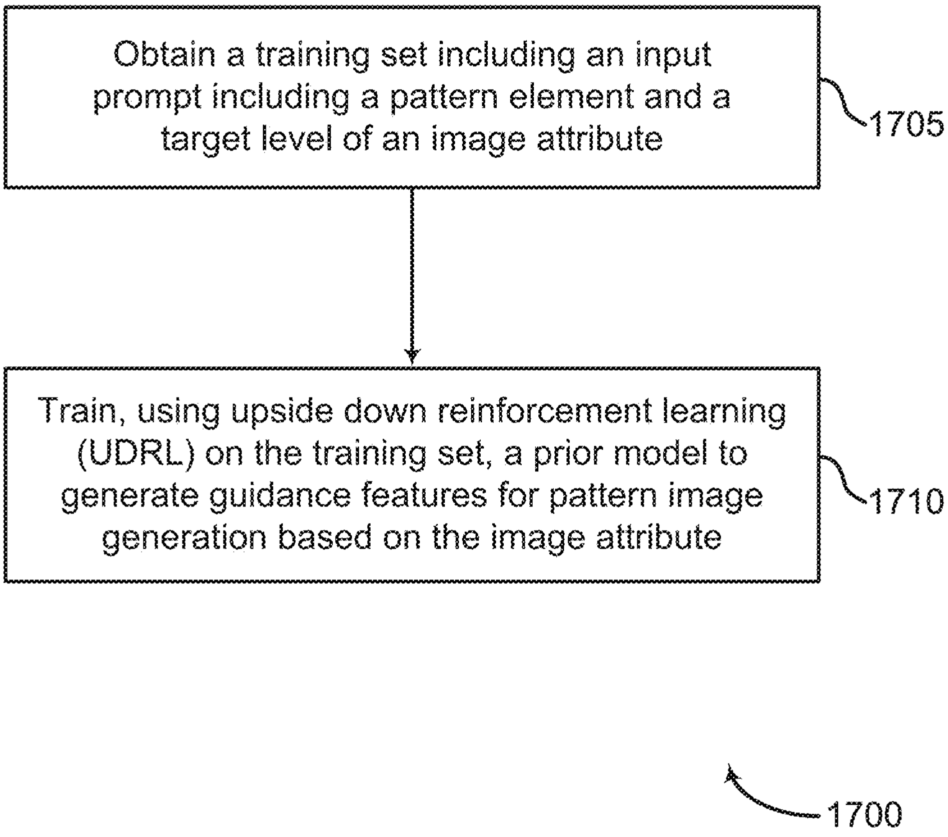
FIG. 17 shows an example of a method for training a prior model according to aspects of the present disclosure.

FIG. 17 shows an example of a method 1700 for training a prior model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system obtains a training set including an input prompt comprising a pattern element and a target level of an image attribute. In some cases, the operations of this step refer to, or may be performed by, a training component as described with reference to FIG. 10. In some cases, obtaining a training set can include creating training data for training a prior model, an image generation model, or both.

At operation 1710, the system trains, using upside down reinforcement learning on the training set, a prior model to generate guidance features for pattern image generation based on the target level of the image attribute. In some cases, the operations of this step refer to, or may be performed by, a training component as described with reference to FIG. 10.

In some examples, a prior model is initialized using random values. In other examples, the prior model is initialized based on a pre-trained model. In some examples, the prior model includes base parameters from a pre-trained model. The prior model is also referred to as a diffusion prior model.

In an embodiment, an image generation model generates a synthesized image based on a guidance feature from the prior model. At training, the image generation model learns to generate synthesized images based on the guidance features from the prior model. In some examples, an image generation model is initialized using random values. In other examples, the image generation model is initialized based on a pre-trained model. In some examples, the image generation model includes base parameters from a pre-trained model.

Figure 18:
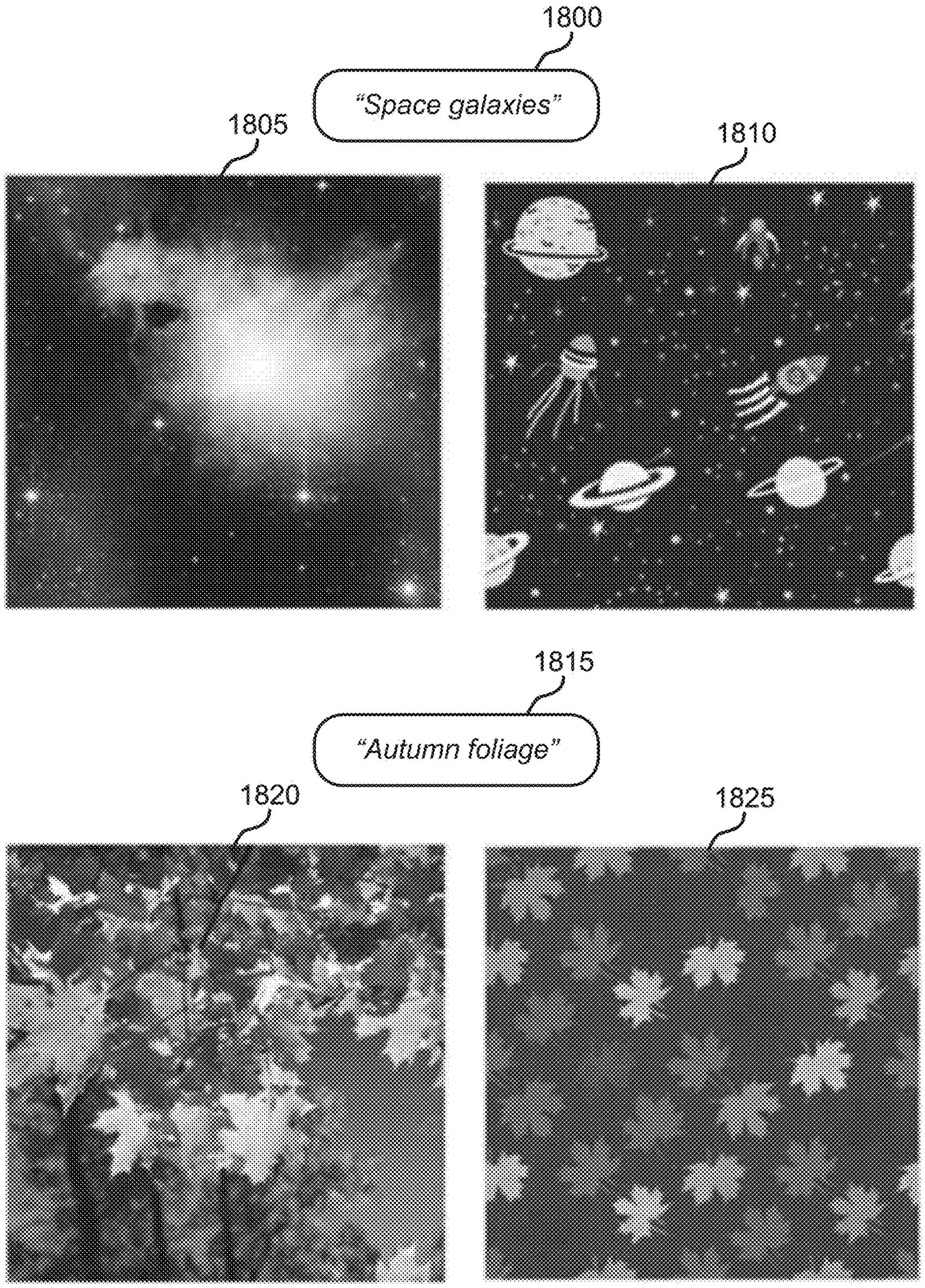
FIG. 18 shows an example of curating a training dataset according to aspects of the present disclosure.

FIG. 18 shows an example of curating a training dataset according to aspects of the present disclosure. The example shown includes first input prompt 1800, first synthesized image 1805, second synthesized image 1810, second input prompt 1815, third synthesized image 1820, and fourth synthesized image 1825.

In some examples, first input prompt 1800 is "Space galaxies" which is input to a machine learning model. The machine learning model is trained on a background dataset and a pattern dataset. The trained machine learning model generates first synthesized image 1805.

In some examples, first input prompt 1800 is "Space galaxies" which is input to a machine learning model (e.g., machine learning model 1025 with reference to FIG. 10). The machine learning model is trained on a background dataset, a pattern dataset with pattern oversampling, and a short query dataset. The trained machine learning model generates second synthesized image 1810. Second synthesized image 1810 is more tileable (seamless image) and has increased aesthetics and higher image quality compared to first synthesized image 1805.

In some examples, second input prompt 1815 is "Autumn foliage" which is input to a machine learning model. The machine learning model is trained on a background dataset and a pattern dataset. The trained machine learning model generates third synthesized image 1820.

In some examples, second input prompt 1815 is "Autumn foliage" which is input to a machine learning model (e.g., machine learning model 1025 with reference to FIG. 10). The machine learning model is trained on a background dataset, a pattern dataset with pattern oversampling, and a short query dataset. The trained machine learning model generates fourth synthesized image 1825. Fourth synthesized image 1825 is more tileable (seamless image) and has increased aesthetics and higher image quality compared to third synthesized image 1820.

In FIGS. 16-18, a method, apparatus, and non-transitory computer readable medium for image generation are described. One or more embodiments of the method, apparatus, and non-transitory computer readable medium include obtaining a training set including an input prompt comprising a pattern element and a target level of an image attribute and training, using upside down reinforcement learning on the training set, a prior model to generate guidance features for pattern image generation based on the target level of the image attribute.

In some examples, the UDRL comprises providing the image attribute as input to the prior model. Some examples of the method, apparatus, and non-transitory computer readable medium further include pre-training the prior model on a preliminary training set having more samples than the training set.

Some examples of the method, apparatus, and non-transitory computer readable medium further include generating, using an image generation model, a synthesized image based on a guidance feature from the prior model, where the synthesized image includes a plurality of versions of the pattern element.

Some examples of the method, apparatus, and non-transitory computer readable medium further include training the image generation model to generate synthesized images based on the guidance features from the prior model.

Some examples of the method, apparatus, and non-transitory computer readable medium further include obtaining a ground-truth image. Some examples further include generating the input prompt based on the ground-truth image.

Some examples of the method, apparatus, and non-transitory computer readable medium further include generating the target level of the image attribute using a classifier model based on the ground-truth image.

Figure 19:
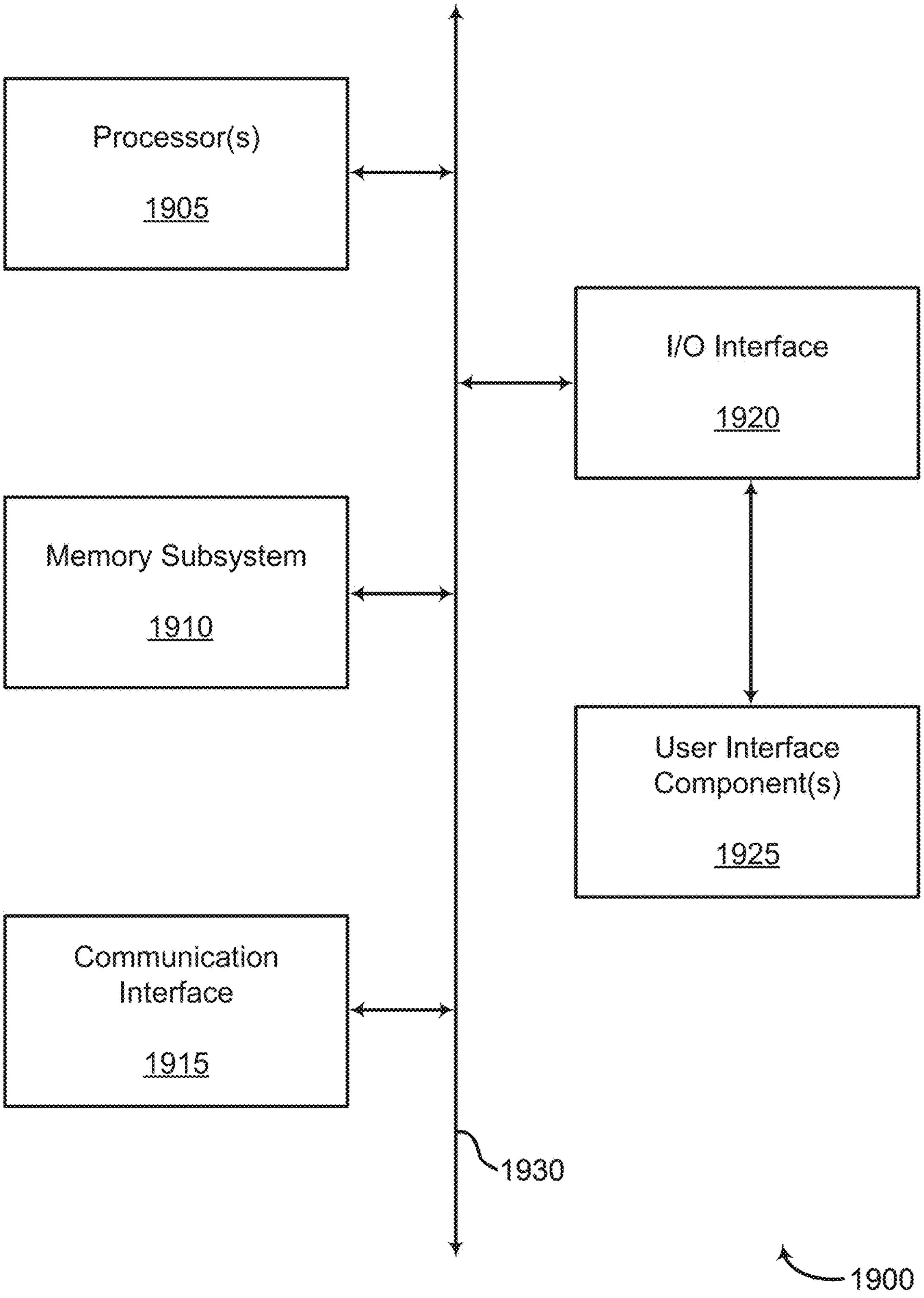
FIG. 19 shows an example of a computing device for image generation according to aspects of the present disclosure.

FIG. 19 shows an example of a computing device 1900 for image generation according to aspects of the present disclosure. The example shown includes computing device 1900, processor(s) 1905, memory subsystem 1910, communication interface 1915, I/O interface 1920, user interface component(s) 1925, and channel 1930. In one embodiment, computing device 1900 includes processor(s) 1905, memory subsystem 1910, communication interface 1915, I/O interface 1920, user interface component(s) 1925, and channel 1930.

In some embodiments, computing device 1900 is an example of, or includes aspects of, image generation apparatus 110 of FIG. 1. In some embodiments, computing device 1900 includes one or more processors 1905 that can execute instructions stored in memory subsystem 1910 to obtain an input prompt comprising a pattern element and a target level of an image attribute; generate, using a prior model, a guidance feature representing the pattern element based on the input prompt, wherein the prior model is trained using reinforcement learning to generate guidance features for pattern image generation based on the target level of the image attribute; and generate, using an image generation model, a synthesized image based on the guidance feature, wherein the synthesized image includes a plurality of versions of the pattern element.

According to some embodiments, computing device 1900 includes one or more processors 1905. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1915 operates at a boundary between communicating entities (such as computing device 1900, one or more user devices, a cloud, and one or more databases) and channel 1930 and can record and process communications. In some cases, communication interface 1915 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1920 is controlled by an I/O controller to manage input and output signals for computing device 1900. In some cases, I/O interface 1920 manages peripherals not integrated into computing device 1900. In some cases, I/O interface 1920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1920 or via hardware components controlled by the I/O controller.

According to some embodiments, user interface component(s) 1925 enable a user to interact with computing device 1900. In some cases, user interface component(s) 1925 include an audio device, such as an external speaker system, an external display device such as a display screen, an input device (e.g., a remote control device interfaced with a user interface directly or through the I/O controller), or a combination thereof. In some cases, user interface component(s) 1925 include a GUI.

Performance of apparatus, systems and methods of the present disclosure have been evaluated, and results indicate embodiments of the present disclosure have obtained increased performance over existing technology. Example experiments demonstrate that the image generation apparatus described in embodiments of the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application-specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input prompt comprising a pattern element and a target level of an image attribute;

generating, using a prior model, a guidance feature representing the pattern element based on the input prompt and the target level of the image attribute, wherein the prior model is trained using upside down reinforcement learning (UDRL) to generate guidance features for generating patterns using an image generation model based on the target level of the image attribute, and wherein the prior model takes the target level of the image attribute as input and generates an input for the image generation model; and generating, using the image generation model, a synthesized image based on the guidance feature, wherein the synthesized image includes a plurality of versions of the pattern element with the target level of the image attribute.

2. The method of claim 1, wherein obtaining the input prompt comprises:

obtaining a preliminary prompt comprising the pattern element; and adding the target level of the image attribute to the preliminary prompt.

3. The method of claim 1, further comprising:

obtaining a preliminary prompt comprising the pattern element; and adding a pattern attribute to the preliminary prompt to obtain an additional prompt, wherein the synthesized image is generated based on the additional prompt.

4. The method of claim 1, wherein:

the target level of the image attribute comprises a scalar value.

5. The method of claim 1, wherein:

the image attribute comprises a pattern classifier attribute.

6. The method of claim 1, wherein:

the image attribute comprises an aesthetic attribute.

7. The method of claim 1, wherein:

the UDRL uses the image attribute as input.

8. The method of claim 1, further comprising:

performing color enhancement on the synthesized image to obtain an enhanced image having a smaller number of colors than the synthesized image.

9. A method for training a machine learning model, the method comprising:

obtaining a training set including an image and an input prompt, wherein the image depicts a pattern element and the input prompt comprises a description of the pattern element and a target level of an image attribute;

generating a predicted guidance feature based on the input prompt;

generating a predicted image based on the predicted guidance feature; and training, using upside down reinforcement learning (UDRL) based on the training set and the predicted image, a prior model to generate guidance features for pattern image generation based on the target level of the image attribute.

10. The method of claim 9, wherein:

the UDRL comprises providing the image attribute as input to the prior model.

11. The method of claim 9, further comprising:

pre-training the prior model on a preliminary training set having more samples than the training set.

12. The method of claim 9, further comprising:

generating, using an image generation model, a synthesized image based on a guidance feature from the prior model, wherein the synthesized image includes a plurality of versions of the pattern element.

13. The method of claim 12, further comprising:

training the image generation model to generate synthesized images based on the guidance features from the prior model.

14. The method of claim 9, wherein obtaining the training set comprises:

obtaining a ground-truth image; and generating the input prompt based on the ground-truth image.

15. The method of claim 14, further comprising:

generating the target level of the image attribute using a classifier model based on the ground-truth image.

16. An apparatus comprising:

at least one processor;

at least one memory including instructions executable by the at least one processor to perform operations comprising:

obtaining an input prompt comprising a pattern element and a target level of an image attribute;

generating, using a prior model, a guidance feature representing the pattern element based on the input prompt and the target level of the image attribute, wherein the prior model is trained using upside down reinforcement learning (UDRL) to generate guidance features for generating patterns using an image generation model based on the target level of the image attribute, and wherein the prior model takes the target level of the image attribute as input and generates an input for the image generation model; and generating, using the image generation model, a synthesized image based on the guidance feature, wherein the synthesized image includes a plurality of versions of the pattern element with the target level of the image attribute.

17. The apparatus of claim 16, wherein:

the prior model comprises a transformer network and the image generation model comprises a diffusion model.

18. The apparatus of claim 16, further comprising:

a color enhancement component configured to perform color enhancement on the synthesized image to obtain an enhanced image having a smaller number of colors than the synthesized image.

19. The apparatus of claim 16, further comprising:

a pattern classifier configured to generate a pattern classifier attribute.

20. The apparatus of claim 16, further comprising:

an aesthetic classifier configured to generate an aesthetic attribute.

* * * * *